United States Patent
Tanaka et al.

(10) Patent No.: US 12,522,629 B2
(45) Date of Patent: Jan. 13, 2026

(54) METHOD FOR PRODUCING NUCLEIC ACID OLIGOMER

(71) Applicant: SUMITOMO CHEMICAL COMPANY, LIMITED, Chuo-ku (JP)

(72) Inventors: Yuki Tanaka, Osaka (JP); Toshifumi Kano, Osaka (JP)

(73) Assignee: SUMITOMO CHEMICAL COMPANY, LIMITED, Chuo-ku (JP)

( * ) Notice: Subject to any disclaimer, the term of this patent is extended or adjusted under 35 U.S.C. 154(b) by 661 days.

(21) Appl. No.: 17/906,820

(22) PCT Filed: Mar. 26, 2021

(86) PCT No.: PCT/JP2021/013023
§ 371 (c)(1),
(2) Date: Sep. 20, 2022

(87) PCT Pub. No.: WO2021/193954
PCT Pub. Date: Sep. 30, 2021

(65) Prior Publication Data
US 2023/0167152 A1  Jun. 1, 2023

(30) Foreign Application Priority Data
Mar. 27, 2020 (JP) .................. 2020-058880

(51) Int. Cl.
*C07H 21/02* (2006.01)
*C07C 51/46* (2006.01)
*C07H 1/00* (2006.01)

(52) U.S. Cl.
CPC ............. *C07H 21/02* (2013.01); *C07C 51/46* (2013.01); *C07H 1/00* (2013.01)

(58) Field of Classification Search
CPC .......... C07H 21/00; C07H 21/02; C07C 51/46
See application file for complete search history.

(56) References Cited

U.S. PATENT DOCUMENTS

| | | | |
|---|---|---|---|
| 7,273,933 B1 | 9/2007 | Krotz et al. | |
| 9,073,848 B2 * | 7/2015 | Jongmans | C07C 51/48 |
| 9,481,702 B2 * | 11/2016 | Aoki | C07H 21/00 |
| 2010/0331397 A1 | 12/2010 | Beigelman et al. | |

(Continued)

FOREIGN PATENT DOCUMENTS

| | | |
|---|---|---|
| CN | 103052711 A | 4/2013 |
| CN | 106573011 A | 4/2017 |

(Continued)

OTHER PUBLICATIONS

Pourshahian, "Therapeutic Oligonucleotides, Impurities, Degradants, and Their Characterization by Mass Spectrometry", Mass Spectrometry Reviews, 2021, vol. 40, pp. 75-109.

(Continued)

*Primary Examiner* — Jonathan S Lau
(74) *Attorney, Agent, or Firm* — Oblon, McClelland, Maier & Neustadt, L.L.P.

(57) ABSTRACT

The present invention provides a method for efficiently producing a nucleic acid oligomer. Specifically, the present invention provides a method for producing a nucleic acid oligomer represented by Formula (2), the method including a step of reacting a nucleic acid oligomer represented by Formula (1) with a dichloroacetic acid solution having a molar ratio of formaldehyde to dichloroacetic acid (formaldehyde mol/dichloroacetic acid mol) of $90 \times 10^{-6}$ or less:

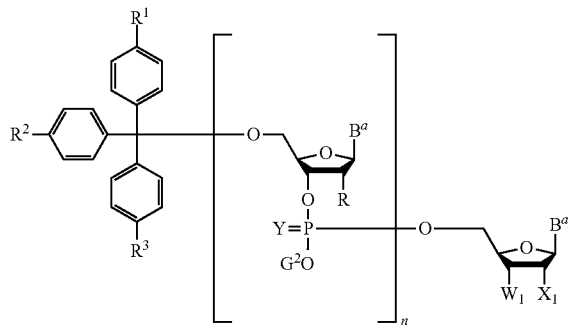

(1)

wherein symbols have the meanings given in the description;

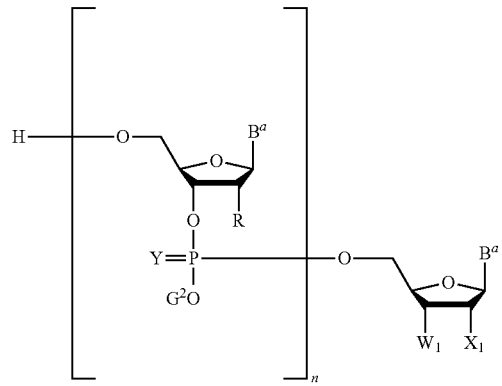

(2)

wherein symbols have the meanings given in the description.

24 Claims, 1 Drawing Sheet

Specification includes a Sequence Listing.

(56) References Cited

U.S. PATENT DOCUMENTS

| | | |
|---|---|---|
| 2012/0035246 A1 | 2/2012 | Ohgi et al. |
| 2014/0329886 A1 | 11/2014 | Ohgi et al. |
| 2015/0366888 A1 | 12/2015 | Blatt et al. |
| 2018/0119151 A1 | 5/2018 | Aoki et al. |
| 2019/0382758 A1 | 12/2019 | Aoki et al. |
| 2021/0024930 A1 | 1/2021 | Inada et al. |
| 2022/0325309 A1 | 10/2022 | Sakata |

FOREIGN PATENT DOCUMENTS

| | | |
|---|---|---|
| WO | WO 99/43694 A1 | 9/1999 |
| WO | WO 2012/017919 A1 | 2/2012 |
| WO | WO 2013/103146 A1 | 7/2013 |
| WO | WO 2016/158809 A1 | 10/2016 |
| WO | WO 2017/131237 A1 | 8/2017 |
| WO | WO 2019/189722 A1 | 10/2019 |
| WO | WO 2021/024465 A1 | 2/2021 |

OTHER PUBLICATIONS

Combined Chinese Office Action and Search Report issued on Mar. 29, 2024 in Chinese Patent Application No. 202180023282.5 (with unedited computer-generated English translation of the Office Action), 14 pages.

Extended European Search Report issued on Mar. 18, 2024 in European Patent Application No. 21774023.2, 10 pages.

International Search Report and Written Opinion issued Jun. 15, 2021 in PCT/JP2021/013023 (with English translation), 18 pages.

Paul, C.H., et al., "Acid binding and detritylation during oligonucleotide synthesis", Nucleic Acids Research, 1996, vol. 24 No. 15, pp. 3048-3052.

Septak, M., "Kinetic studies on depurination and detritylation of CPG-bound intermediates during oligonucleotide synthesis", Nucleic Acids Research, 1996, vol. 24, No. 15, pp. 3053-3058.

Lönnberg, H., "Synthesis of oligonucleotides on a soluble support", Beilstein Journal of Organic Chemistry, 2017, 13, pp. 1368-1387.

* cited by examiner

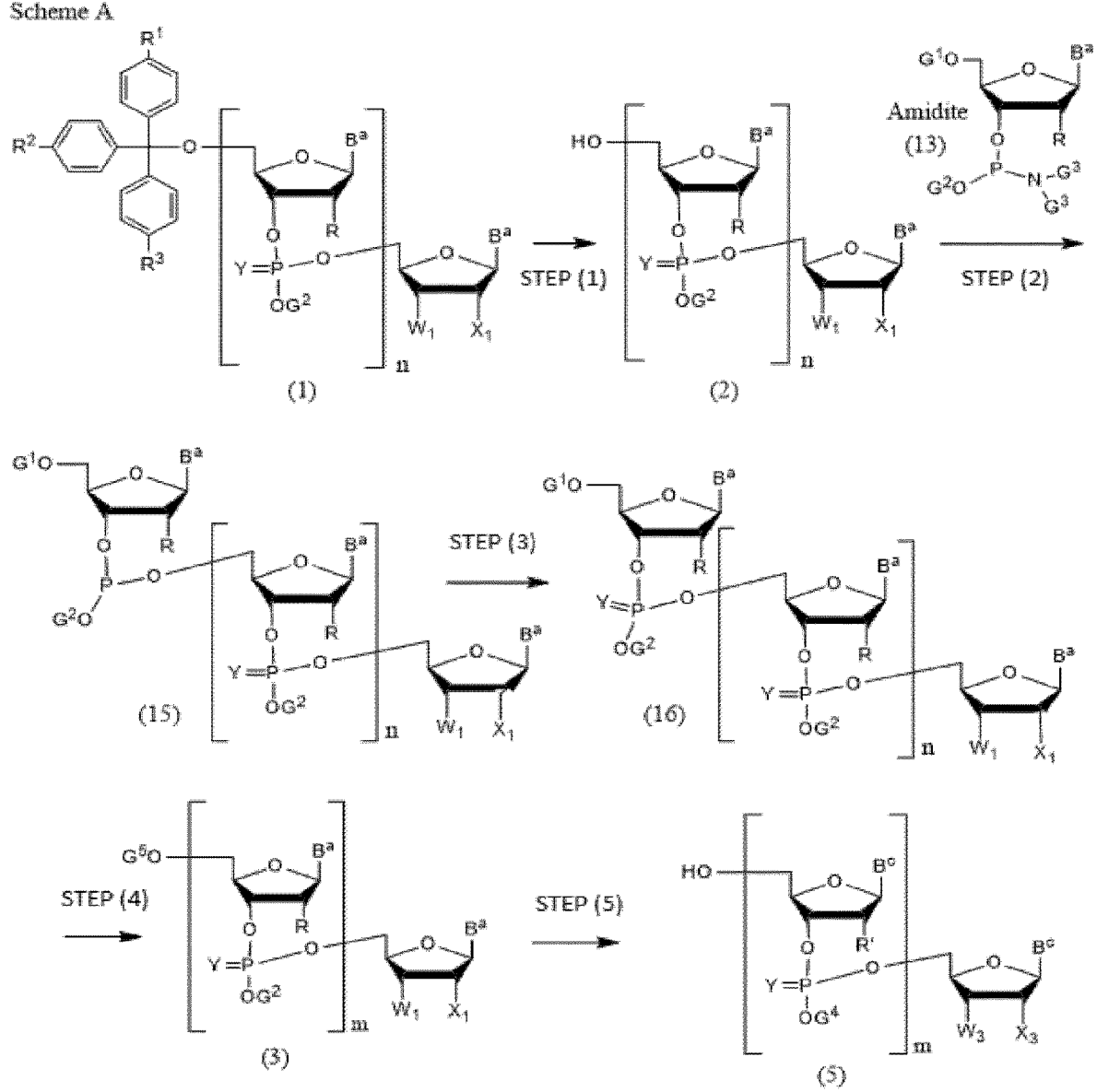

METHOD FOR PRODUCING NUCLEIC ACID OLIGOMER

CROSS-REFERENCE TO RELATED APPLICATIONS

The present application is a 35 U.S.C. § 371 national stage patent application of International patent application PCT/JP2021/013023, filed on Mar. 26, 2021, which is based on and claims the benefits of priority to Japanese Application No. 2020-058880, filed on Mar. 27, 2020. The entire contents of these applications are incorporated herein by reference.

TECHNICAL FIELD

This application claims priority to and the benefit of Japanese Patent Application No. 2020-058880 filed on Mar. 27, 2020, the entire contents of which are incorporated herein by reference.

The present invention relates to a method for producing a nucleic acid oligomer.

BACKGROUND ART

In recent years, there is an increasing interest in the application of nucleic acid oligomers to the medical field. For example, antisense nucleic acids, aptamers, ribozymes, and nucleic acids that induce RNA interference (RNAi) such as siRNA are referred to as nucleic acid pharmaceuticals.

A nucleic acid oligomer can be synthesized by solid-phase synthesis, and a nucleic acid oligomer synthesized by elongating a nucleic acid on a solid support is cut out from the solid support, and then in the case of a nucleic acid oligomer containing ribose, a protecting group of a hydroxyl group at the 2'-position of ribose is removed by deprotection of the hydroxyl group of the nucleic acid oligomer, to produce a target nucleic acid oligomer. In the solid-phase synthesis, it is known that phosphoramidite (hereinafter, referred to as "amidite") of a nucleoside is used as a raw material, and the protecting group of the hydroxyl group at the 5'-position is deprotected using a dichloroacetic acid solution, but the yield of a nucleic acid oligomer synthesized using a conventional dichloroacetic acid solution is not necessarily satisfactory, and synthesis is not efficient (Patent Document 1).

PRIOR ART DOCUMENTS

Patent Document

Patent Document 1: WO 99/43694 A

SUMMARY OF THE INVENTION

Problems to be Solved by the Invention

An object of the present invention is to provide a method for efficiently producing a nucleic acid oligomer.

Means for Solving the Problems

As a result of intensive studies to achieve the above object, the present inventors provide a method for efficiently producing a nucleic acid oligomer, in which, in the synthesis of a nucleic acid oligomer, a dichloroacetic acid solution having a formaldehyde concentration equal to or less than a certain value is used, or a dichloroacetic acid solution containing dichloroacetic acid with improved quality is used.

The present invention includes, but is not limited to, the following aspects.

1. A method for producing a nucleic acid oligomer represented by Formula (2),
   the method including a step of reacting a nucleic acid oligomer represented by Formula (1) with a dichloroacetic acid solution having a molar ratio of formaldehyde to dichloroacetic acid (formaldehyde mol/dichloroacetic acid mol) of $90 \times 10^{-6}$ or less:

[Chemical Formula 1]

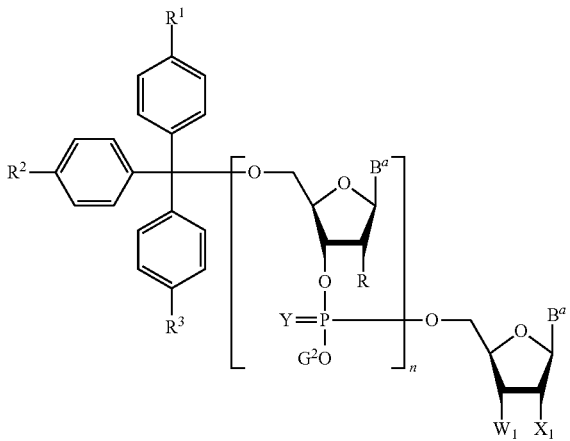

(1)

wherein
G$^2$ represents a protecting group of a hydroxyl group,
B$^a$ is the same or different and each independently represents a nucleobase which may be protected with a protecting group,
R$^1$, R$^2$ and R$^3$ are the same or different and each independently represent a hydrogen atom or an alkoxy group,
R is the same or different and each independently represents a protected hydroxyl group, a hydrogen atom, a fluorine atom, a methoxy group, a 2-methoxyethyl group, or an OQ' group,
Q' is the same or different and each independently represents a methylene group bonded to a carbon atom at a 4'-position of ribose, an ethylene group bonded to a carbon atom at a 4'-position of ribose, or an ethylidene group bonded to a carbon atom at a 4'-position of ribose,
Y is the same or different and each independently represents an oxygen atom or a sulfur atom,
n represents any integer of 1 to 200,
W$_1$ represents an OZ group and X$_1$ represents an R group, or
W$_1$ represents an OV group, and X$_1$ represents an OZ group,
V represents a protecting group of a hydroxyl group,
Z is a group having a structure including a solid support and a linking group, and
when n is an integer of 2 or more, a non-nucleotide linker may be incorporated between respective nucleotides in the nucleic acid oligomer represented by Formula (1); and

[Chemical Formula 2]

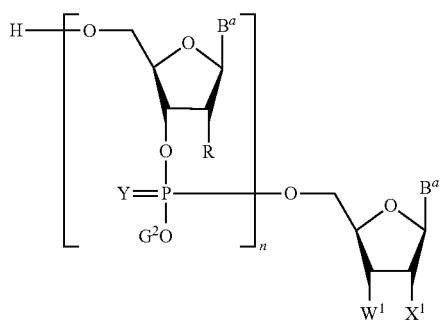

(2)

wherein
G², Bᵃ, R, Y, X₁, W₁, and n are as described above, and
a non-nucleotide linker may be incorporated between nucleotides as defined in Formula (1).

2. A method for producing a nucleic acid oligomer represented by Formula (2'), the method including:
the step described in the item 1;
a step of removing a group represented by Z from the nucleic acid oligomer represented by Formula (2) produced in the step described in the item 1; and
a step of removing a protecting group of a hydroxyl group and a nucleobase:

[Chemical Formula 3]

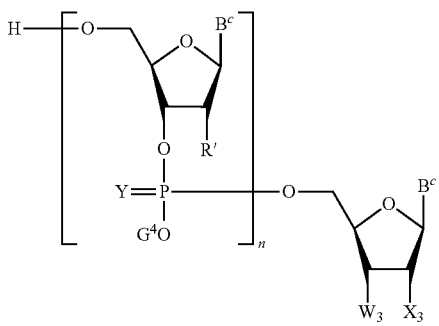

(2')

wherein
Y and n are as described above,
$B^c$ is the same or different and each independently represents a nucleobase,
$G^4$ is the same or different and each independently represents a hydrogen atom, an alkali metal ion, an ammonium ion, an alkylammonium ion, or a hydroxyalkylammonium ion,
R' is the same or different and each independently represents a hydroxyl group, a hydrogen atom, a fluorine atom, a methoxy group, a 2-methoxyethyl group, or an OQ' group,
Q' is as described above,
$X_3$ and $W_3$ each independently represent a hydroxyl group, or
$X_3$ represents an R' group, and $W_3$ represents a hydroxyl group.

3. The production method according to the item 1, further including:
a step of optionally elongating a chain length of the nucleic acid oligomer represented by Formula (2) by an amidite method, to produce a nucleic acid compound represented by Formula (3); and
a step of cutting out a compound represented by Formula (4) from the nucleic acid compound represented by Formula (3), and further deprotecting the compound represented by Formula (4), to produce a nucleic acid oligomer represented by Formula (5):

[Chemical Formula 4]

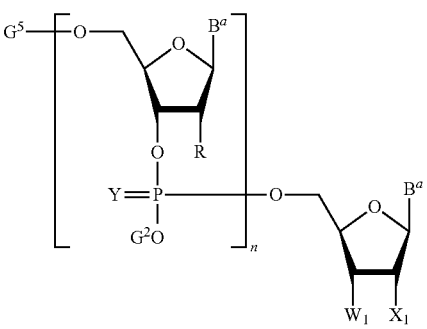

(3)

wherein
$G^2$, $B^a$, R, Y, $X_1$, and $W_1$ are as described above,
$G^5$ is a protecting group of a hydroxyl group represented by a following formula or a hydrogen atom;

[Chemical Formula 5]

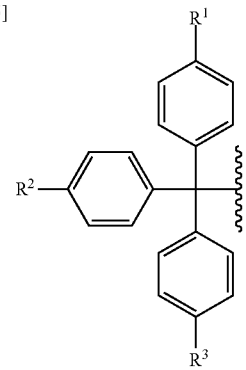

wherein $R^1$, $R^2$, and $R^3$ are as described above, and
m is an integer satisfying m≥n;

[Chemical Formula 6]

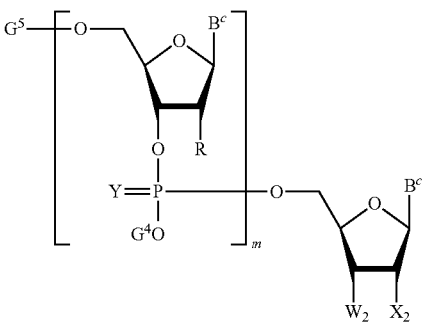

(4)

wherein
$G^5$, R, Y, and m are as described above,
$G^4$ is the same or different and each independently represents a hydrogen atom, an alkali metal ion, an ammonium ion, an alkylammonium ion, or a hydroxyalkylammonium ion, $B^c$ is the same or different and each independently represents a nucleobase, $X_2$ represents a hydroxyl group, and $W_2$ represents an OV group, or $X_2$ represents an R group, and $W_2$ represents a hydroxyl group, and V represents a protecting group of a hydroxyl group; and

[Chemical Formula 7]

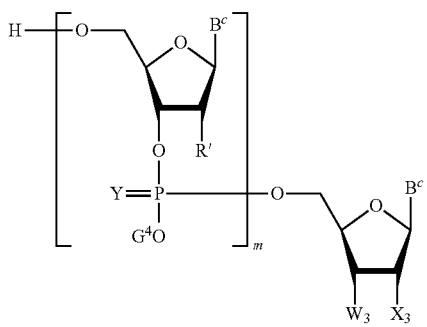

(5)

wherein $G^4$, $B^c$, Y, and m are as described above,

R' is the same or different and each independently represents a hydroxyl group, a hydrogen atom, a fluorine atom, a methoxy group, a 2-methoxyethyl group, or an OQ' group, Q' is as described above, $X_3$ and $W_3$ each independently represent a hydroxyl group, or $X_3$ represents an R' group, and $W_3$ represents a hydroxyl group.

4. The production method according to any one of the items 1 to 3, wherein the non-nucleotide linker is a linker including an amino acid skeleton.

5. The production method according to the item 4, wherein the linker including an amino acid skeleton is a linker having a structure selected from the group consisting of Formulae (A14-1), (A14-2), and (A14-3) below:

[Chemical Formula 8]

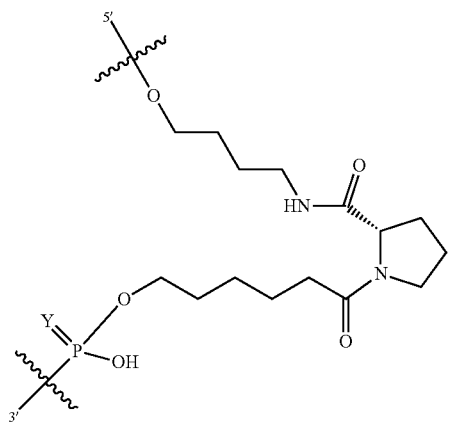

(A14-1)

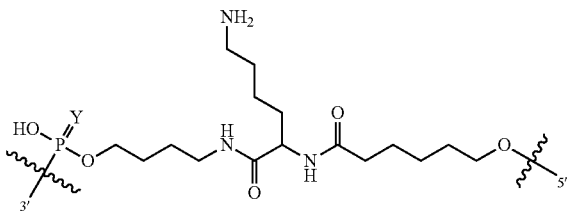

(A14-2)

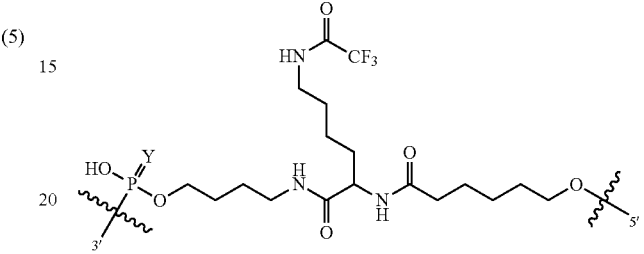

(A14-3)

wherein Y is as described above.

6. The production method according to any one of the items 1 to 5, wherein the dichloroacetic acid solution contains at least one solvent selected from the group consisting of dichloromethane, acetonitrile, and an aromatic organic solvent.

7. The production method according to any one of the items 1 to 6, wherein the molar ratio of formaldehyde to dichloroacetic acid (formaldehyde mol/dichloroacetic acid mol) in the dichloroacetic acid solution is $43 \times 10^{-6}$ or less.

8. The production method according to any one of the items 1 to 6, wherein the molar ratio of formaldehyde to dichloroacetic acid (formaldehyde mol/dichloroacetic acid mol) in the dichloroacetic acid solution is $22 \times 10^{-6}$ or less.

9. The production method according to any one of the items 1 to 8, wherein the nucleic acid oligomer is a ribonucleic acid (RNA).

10. The production method according to any one of the items 1 to 8, wherein the nucleic acid oligomer is a ribonucleic acid (RNA), and a protecting group of a hydroxyl group at a 2'-position of ribose of the nucleic acid oligomer is a protecting group represented by Formula (6):

[Chemical Formula 9]

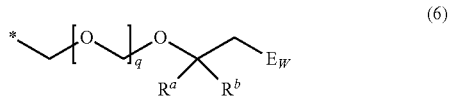

(6)

wherein q represents any integer of 1 to 5, $R^a$ and $R^b$ are the same or different and each independently represent a methyl group, an ethyl group or a hydrogen atom,

* represents a bonding point to an oxygen atom derived from a hydroxyl group at a 2'-position of ribose, and $E_W$ represents an electron withdrawing group.

11. The production method according to the item 10, wherein $R^a$ and $R^b$ are simultaneously a hydrogen atom, and $E_W$ is a cyano group.

12. The production method according to any one of the items 1 to 11, wherein the nucleic acid oligomer is an oligomer having a chain length of 40 or more.

13. The production method according to any one of the items 1 to 11, wherein the nucleic acid oligomer is an oligomer having a chain length of 50 or more.

14. The production method according to any one of the items 1 to 11, wherein the nucleic acid oligomer is an oligomer having a chain length of 60 or more.

15. The production method according to any one of the items 1 to 11, wherein the nucleic acid oligomer is an oligomer having a chain length of 80 or more.

16. The production method according to any one of the items 1 to 11, wherein the nucleic acid oligomer is an oligomer having a chain length of 100 or more.

17. A dichloroacetic acid solution, wherein a molar ratio of formaldehyde to dichloroacetic acid (formaldehyde mol/dichloroacetic acid mol) is $90 \times 10^{-6}$ or less.

18. The dichloroacetic acid solution according to the item 17, wherein the molar ratio of formaldehyde to dichloroacetic acid (formaldehyde mol/dichloroacetic acid mol) is $43 \times 10^{-6}$ or less.

19. The dichloroacetic acid solution according to the item 17, wherein the molar ratio of formaldehyde to dichloroacetic acid (formaldehyde mol/dichloroacetic acid mol) is $22 \times 10^{-6}$ or less.

20. A method for producing the dichloroacetic acid solution according to any one of the items 17 to 19, the method including a step of azeotropically distilling off formaldehyde from an unpurified dichloroacetic acid solution containing formaldehyde, and a solution containing an azeotropic solvent that forms an azeotrope with formaldehyde, to obtain a purified dichloroacetic acid solution.

21. The production method according to the item 20, wherein the azeotropic solvent has a boiling point of 194° C. or lower.

22. The production method according to the item 20 or 21, wherein the azeotropic solvent is dichloromethane, acetonitrile, or an aromatic organic solvent.

23. The production method according to the item 22, wherein the aromatic organic solvent is toluene.

24. A method for producing a nucleic acid oligomer, the method including: the step described in the item 20, including purifying a dichloroacetic acid solution; and the step described in any one of the items 1 to 3, wherein the purified dichloroacetic acid solution obtained in the step described in the item 20 is used.

Effect of the Invention

The present invention provides a method for efficiently producing a nucleic acid oligomer. According to the production method of the present invention, improvement in the yield of the nucleic acid oligomer to be produced can be expected.

BRIEF DESCRIPTION OF THE DRAWING

FIG. 1 is Scheme A showing a typical example of producing a nucleic acid oligomer represented by Formula (5) from a nucleic acid oligomer represented by Formula (1). In the drawing, $G^1$ can be used without particular limitation as long as it can function as a protecting group of a hydroxyl group, and known protecting groups used in an amidite compound can be widely used. $G^3$ is the same or different and each independently represents an alkyl group, or two $G^3$s may be bonded to each other to form a cyclic structure. Preferably, $G^3$ is the same or different and is each independently an alkyl group, for example, a methyl group, an ethyl group, a propyl group, or an isopropyl group, and more preferably, both $G^3$s are an isopropyl group. Other symbols are as described above.

MODE FOR CARRYING OUT THE INVENTION

A method for reacting a nucleic acid oligomer represented by Formula (1) with a dichloroacetic acid solution having a formaldehyde concentration equal to or less than a certain value to obtain a nucleic acid oligomer represented by Formula (2) will be described.

The molar ratio of formaldehyde to dichloroacetic acid (formaldehyde mol/dichloroacetic acid mol) in the dichloroacetic acid solution of the present invention is usually $90 \times 10^{-6}$ or less, preferably $43 \times 10^{-6}$ or less, and more preferably $22 \times 10^{-6}$ or less. A method for measuring the concentration of formaldehyde in the dichloroacetic acid solution includes gas chromatography and high performance liquid chromatography. In gas chromatography, formaldehyde is directly analyzed, and the concentration thereof is calculated. In high performance liquid chromatography, formaldehyde and acetylacetone are reacted, the amount of 3,5-diacetyl-1,4-dihydrolutidine obtained is measured, and the formaldehyde concentration is calculated.

The concentration of dichloroacetic acid in the dichloroacetic acid solution is usually 0.1 to 2.4 M, preferably 0.1 to 1.2 M, more preferably 0.1 to 0.6 M, and still more preferably 0.2 to 0.4 M.

The diluent solvent of dichloroacetic acid is not particularly limited as long as it is not involved in the reaction. Examples thereof include dichloromethane, acetonitrile, an aromatic organic solvent, water, or an optional mixed solvent, preferably include at least one solvent selected from the group consisting of dichloromethane, acetonitrile, and an aromatic organic solvent, and more preferably include an aromatic organic solvent. Examples of the aromatic organic solvent include toluene.

The reaction temperature in the reaction is preferably 0 to 40° C., more preferably 10 to 30° C.

Formaldehyde in the dichloroacetic acid solution can be removed by azeotropic distillation with an optional solvent or an optional mixed solvent. The azeotropic solvent is not particularly limited as long as it is a solvent having a boiling point lower than that of dichloroacetic acid. Examples thereof include dichloromethane, acetonitrile, an aromatic organic solvent, or an optional mixed solvent, preferably include dichloromethane, acetonitrile, or an aromatic organic solvent, and more preferably include an aromatic organic solvent. Examples of the aromatic organic solvent include toluene.

The boiling point of the azeotropic solvent is preferably 200° C. or lower, and more preferably 194° C. or lower.

For storing the dichloroacetic acid solution, a glass container, a plastic container, or a metal container can be used. As the plastic container, a container made of polyethylene or polypropylene can be used, and as the metal container, a container made of SUS or Hastelloy can be used.

An oxidation solution can be stored under an air atmosphere or an inert gas atmosphere, and as an inert gas, argon, nitrogen, carbon dioxide, helium, or the like can be used.

Examples of the nucleic acid compound having a protecting group at the hydroxyl group at the 5'-position thereof include the nucleic acid compound represented by Formula (1) above. Examples of the nucleic acid compound produced by reacting the nucleic acid compound with the dichloroacetic acid solution include the nucleic acid compound represented by Formula (2) above.

Specific examples of the compound represented by Q', which is the same or different and each independently represents a methylene group bonded to a carbon atom at the 4'-position of ribose, an ethylene group bonded to a carbon atom at the 4'-position of ribose, or an ethylidene group bonded to a carbon atom at the 4'-position of ribose in Formulae (1) and (2) include a structure represented by LNA-1, LNA-2, or LNA-3 in Formula (7) below.

[Chemical Formula 10]

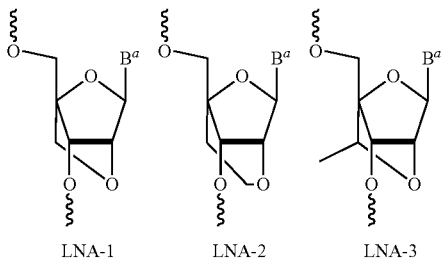

(7)

LNA-1  LNA-2  LNA-3 wherein $B^a$ represents a nucleobase which may be protected.

More specific examples of the group represented by Z, which has a structure including: a solid support; and a linking group connecting the solid support and an oxygen atom of the hydroxyl group at the 2'-position or the 3'-position of ribose at the 3'-end of the nucleic acid oligomer, include a structure represented by Formula (8) below.

[Chemical Formula 11]

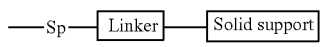

(8)

In Formula (8), Sp represents a spacer.

Examples of the spacer (Sp) include a spacer having a structural formula represented by Formula (9) below.

[Chemical Formula 12]

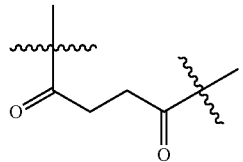

(9)

The linker may have, for example, a structure represented by Formula (10) below, or a structure having no hexamethylene amino group moiety in the structure of Formula (10) and having an aminopropyl group bonded to Si. Alternatively, the linker may have a structure represented by Formula (11) below.

[Chemical Formula 13]

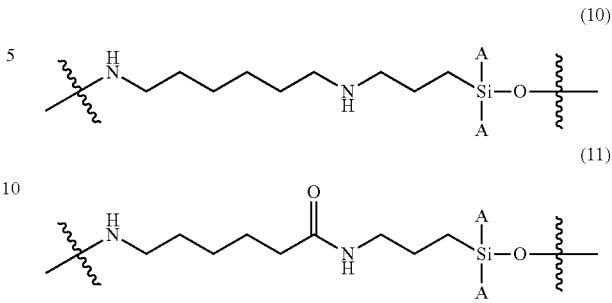

wherein
A may be any of a hydroxyl group, an alkoxy group, and an alkyl group. Examples of the alkoxy group include a methoxy group and an ethoxy group. Examples of the alkyl group include a methyl group, an ethyl group, an isopropyl group, and an n-propyl group. Si indicates that Si is bonded to oxygen of a hydroxyl group on the surface of the support.

Examples of the solid support include an inorganic porous support and an organic resin support. Examples of the inorganic porous support include controlled pore glass (CPG). Examples of the organic resin support include a support made of polystyrene.

Examples of the nucleoside (ribose and deoxyribose) contained in the nucleic acid oligomer used in the present invention include DNA, RNA, 2'-O-MOE (2'-O-methoxyethyl), 2'-O-Me, 2'-F RNA, and the above-described LNAs, but the nucleoside is not limited thereto.

The method for synthesizing a nucleic acid oligomer by solid-phase synthesis, which includes the deprotection step with a dichloroacetic acid solution, typically includes the following steps:

(1) a step of deprotecting a hydroxyl group at the 5'-position of a nucleoside having a protected hydroxyl group bonded to a solid support via a linker;

(2) a step of subjecting the hydroxyl group at the 5'-position produced in the step (1) to a coupling reaction with a phosphoramidite compound to obtain a phosphite triester compound;

(3) a step of oxidizing the phosphite triester produced in the step (2) to be converted into a phosphate triester, thereby producing an elongated nucleic acid molecule, or an optional step of converting the phosphite triester into a thiophosphate triester;

(4) a step of repeating a series of reaction cycles consisting of the steps (1) to (3), that is, the deprotection step of deprotecting the hydroxyl group at the 5'-position of the produced nucleic acid molecule, the coupling step of coupling the hydroxyl group at the 5'-position with the amidite compound, and the oxidation step of oxidizing the produced phosphite triester, any number of times, to thereby synthesize a nucleic acid molecule on the solid support; and (5) a step of subjecting the nucleic acid molecule produced in the step (4) on the solid support to a step of performing cutting out and deprotection, to release the nucleic acid molecule from the solid support, thereby producing a nucleic acid oligomer from which the protecting group has been removed.

Incidentally, the method for synthesizing a nucleic acid oligomer may include, following the step (2) or (3), a step of capping the hydroxyl group at the 5'-position where the coupling reaction with the phosphoramidite compound did not proceed, or include a capping step between any steps of a series of reaction cycles constituting the step (4).

More specifically, the step (5) is performed by subjecting the nucleic acid molecule on the solid support, produced in the step (4) to the reactions of the following steps (5-1) and (5-2) in this order, and then subjecting the resulting nucleic acid molecule to the reaction of step (5-3). Here, the reaction in the step (5-1) may be performed optionally, or the reaction in the step (5-2) may be performed according to the method described in JP-B-4705716. As a result, a nucleic acid oligomer in which the protecting group has been removed from the nucleic acid molecule released from the solid support or a nucleic acid oligomer whose hydroxyl group at the 5'-end is protected can be produced.

(5-1) A reaction of deprotecting a protecting group of a hydroxyl group at the 5'-end of the nucleic acid molecule;
(5-2) A reaction of cutting out and releasing the nucleic acid molecule from the solid support; and
(5-3) A reaction of deprotecting a protecting group of a hydroxyl group at the 2'-position or the 3'-position of the 3'-end of ribose constituting the nucleic acid molecule.

The scheme of the steps (1) to (5) is shown in FIG. 1. The deprotection reaction in the step (1) or the step (4) shown in FIG. 1 is performed using the dichloroacetic acid solution. The definition of the substituents in the chemical formula in Scheme A is as defined above.

The nucleic acid compound of Formula (1) is further elongated by an optional chain length using a nucleotide type or non-nucleotide type linker by an amidite method, and can be used for the production of the nucleic acid compound represented by Formula (3). It is also possible to cut out only a nucleic acid compound from the nucleic acid compound of Formula (3) bonded to the solid support, to obtain the nucleic acid oligomer represented by Formula (4), and then further perform deprotection of the obtained nucleic acid oligomer, to thereby produce the nucleic acid oligomer represented by Formula (5). Hereinafter, the substituents in each formula will be described in more detail.

The nucleobase represented by $B^a$, which may be protected by a protecting group, and the nucleobase represented by $B^c$ are not particularly limited. Examples of the nucleobase include adenine, cytosine, guanine, uracil, thymine, 5-methylcytosine, pseudouracil, and 1-methylpseudouracil. The nucleobase may be substituted with a substituent. Examples of such a substituent include a halogen atom such as a fluoro group, a chloro group, a bromo group, or an iodo group; an acyl group such as an acetyl group; an alkyl group such as a methyl group or an ethyl group; an arylalkyl group such as a benzyl group; an alkoxy group such as a methoxy group; an alkoxyalkyl group such as a methoxyethyl group; a cyanoalkyl group such as a cyanoethyl group; a hydroxy group, a hydroxyalkyl group, an acyloxymethyl group, an amino group, a monoalkylamino group, a dialkylamino group, a carboxy group, a cyano group, a nitro group, and combinations of two or more types of these substituents.

The protecting group of the nucleobase represented by $B^a$ which may be protected with a protecting group is not particularly limited, and can be a protecting group used in known nucleic acid chemistry. Examples of such a protecting group include a benzoyl group, a 4-methoxybenzoyl group, a 4-methylbenzoyl group, an acetyl group, a propionyl group, a butyryl group, an isobutyryl group, a phenylacetyl group, a phenoxyacetyl group, a 4-tert-butylphenoxyacetyl group, a 4-isopropylphenoxyacetyl group, and a (dimethylamino)methylene group, and combinations of two or more types thereof.

$B^a$ represents more specifically a group represented by any one of the following groups:

[Chemical Formula 14]

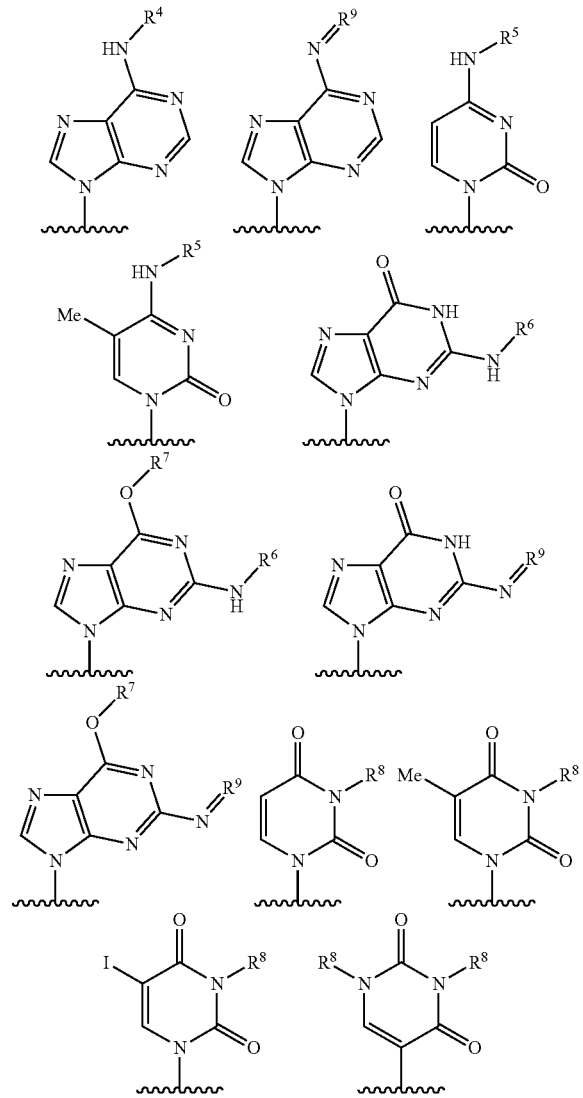

wherein $R^4$ represents a hydrogen atom, a methyl group, a phenoxyacetyl group, a 4-tert-butylphenoxyacetyl group, a 4-isopropylphenoxyacetyl group, a phenylacetyl group, an acetyl group or a benzoyl group, $R^5$ represents a hydrogen atom, an acetyl group, an isobutyryl group or a benzoyl group, $R^6$ represents a hydrogen atom, a phenoxyacetyl group, a 4-tert-butylphenoxyacetyl group, a 4-isopropylphenoxyacetyl group, a phenylacetyl group, an acetyl group or an isobutyryl group, $R^7$ represents a 2-cyanoethyl group, $R^8$ represents a hydrogen atom, a methyl group, a benzoyl group, a 4-methoxybenzoyl group or a 4-methylbenzoyl group, and $R^9$ represents a dimethylaminomethylene group.

More specific examples of $B^c$ include a group obtained by removing a protecting group from the specific examples of $B^a$.

$G^5$ is preferably the following group.

[Chemical Formula 15]

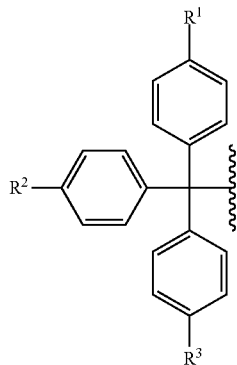

wherein $R^1$, $R^2$ and $R^3$ are the same or different and each independently represent a hydrogen atom or an alkoxy group.

Among $R^1$, $R^2$ and $R^3$, preferably, one is a hydrogen atom, and the remaining two are alkoxy groups which are the same or different (preferably the same), and the alkoxy group is particularly preferably a methoxy group. More preferably, $G^5$ is a 4,4'-dimethoxytrityl group (DMTr group).

$G^2$ can be used without particular limitation as long as it can function as a protecting group of a hydroxyl group, and known protecting groups used in an amidite compound can be widely used. Examples of $G^2$ include an alkyl group, an alkenyl group, an alkynyl group, a cycloalkyl group, a haloalkyl group, an aryl group, a heteroaryl group, an arylalkyl group, a cycloalkenyl group, a cycloalkylalkyl group, a cyclylalkyl group, a hydroxyalkyl group, an aminoalkyl group, an alkoxyalkyl group, a heterocyclylalkenyl group, a heterocyclylalkyl group, a heteroarylalkyl group, a silyl group, a silyloxyalkyl group, a mono-, di- or trialkylsilyl group, and a mono-, di- or trialkylsilyloxyalkyl group, and these groups may be substituted with one or more electron withdrawing groups.

$G^2$ is preferably an alkyl group substituted with an electron withdrawing group. Examples of the electron withdrawing group include a cyano group, a nitro group, an alkylsulfonyl group, a halogen atom, an arylsulfonyl group, a trihalomethyl group, and a trialkylamino group, and a cyano group is preferable.

As $G^2$, the following group is particularly preferable.

[Chemical Formula 16]

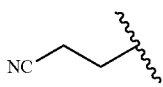

The alkyl group in the definition of $R^1$, $R^2$, $R^3$, and $G^2$ may be linear or branched, and is preferably an alkyl group having 1 to 12 carbon atoms, and more preferably an alkyl group having 1 to 6 carbon atoms. Specific examples of the alkyl group include a methyl group, an ethyl group, an n-propyl group, an isopropyl group, an n-butyl group, an isobutyl group, a tert-butyl group, an n-pentyl group, an isopentyl group, and a hexyl group. The alkyl group moiety constituting the alkoxy group in the definition of the substituent has the same definition as the definition of the alkyl group herein.

In the method of the present invention, the amidite compound can be used in a free state or a salt state. Examples of the salt of the amidite compound include, but are not particularly limited to, a base addition salt or an acid addition salt. Specific examples of the base addition salt include salts with inorganic bases such as a sodium salt, a magnesium salt, a potassium salt, a calcium salt, and an aluminum salt; salts with organic bases such as methylamine, ethylamine, and ethanolamine; salts with basic amino acids such as lysine, ornithine, and arginine; and ammonium salts. Specific examples of the acid addition salt include mineral acids such as hydrochloric acid, hydrobromic acid, hydroiodic acid, sulfuric acid, nitric acid and phosphoric acid; organic acids such as formic acid, acetic acid, propionic acid, oxalic acid, malonic acid, malic acid, tartaric acid, fumaric acid, succinic acid, lactic acid, maleic acid, citric acid, methanesulfonic acid, trifluoromethanesulfonic acid, and ethanesulfonic acid; and acid addition salts with acidic amino acids such as aspartic acid and glutamic acid. The amidite compound also include forms such as salts, hydrates, solvates, and crystal polymorphs.

R preferably represents a protected hydroxyl group. The protecting group when R represents a protected hydroxyl group or the protecting group of the hydroxyl group, which is represented by V, may be any group that can be used in an amidite method. Examples of the protecting group that can be used include a 2'-tert-butyldimethylsilyl (TBS) group, a 2'-bis(2-acetoxy)methyl (ACE) group, a 2'-(triisopropylsilyloxy)methyl (TOM) group, a 2'-(2-cyanoethoxy)ethyl (CEE) group, a 2'-(2-cyanoethoxy)methyl (CEM) group, a 2'-para-toluylsulfonylethoxymethyl (TEM) group, and a 2'-EMM group (WO 2006/022323 A), and further include the groups described in WO 2013/027843 A and WO 2019/208571 A. V is preferably a 2'-tert-butyldimethylsilyl (TBS) group. In addition, when ribose is contained in the nucleic acid oligomer, for example, when the nucleic acid oligomer produced by the method of the present invention is a ribonucleic acid (RNA), the protecting group represented by Formula (6) above is exemplified as a preferred protecting group of a hydroxyl group at the 2'-position of ribose of the nucleic acid oligomer. More preferably, a protecting group having a cyano group as the electron withdrawing group represented by $E_W$, the protecting group being represented by Formula (12), is exemplified:

[Chemical Formula 17]

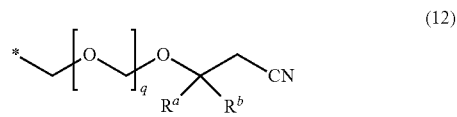

(12)

wherein q, $R^a$, and $R^b$ have the same meaning as defined in Formula (6) above.

More preferably, in the group represented by Formula (12), a group in which q is 1, and $R^a$ and $R^b$ are simultaneously a hydrogen atom is exemplified.

The protecting group represented by Formula (12) can be synthesized, for example, in accordance with the description of WO 2013/027843 A and WO 2019/208571 A, and an amidite compound having such a protecting group can be used for the production of a nucleic acid compound.

An amidite compound of Formula (13) described in Scheme A of FIG. 1 is used for the elongation reaction of the nucleic acid.

Examples of the non-nucleotide linker include a linker including an amino acid skeleton (for example, the linker including an amino acid skeleton described in JP-B-5157168 or JP-B-5554881). Specifically, for example, a linker represented by Formula (A14-1), (A14-2), or (A14-3) (for example, described in WO 2019/074110 A) is exemplified as a non-limiting example. In addition to these linkers, the linker described in WO 2012/005368 A, WO 2018/182008 A, or WO 2019/074110 A is exemplified.

Nucleotides and amidites, in which the R group in Formula (13) and the R' group in Formula (5) are substituents other than a hydroxyl group, can also be produced from nucleosides synthesized by known methods described in JP-B-3745226 and the like, WO 2001/053528 A or JP-A-2014-221817 and known methods cited therein. Further, the nucleotides and amidites can be produced using those available as commercial products in accordance with the methods described in Examples described later or by a method in which these methods are appropriately changed.

$G^4$ represents a hydrogen atom, an alkali metal ion, an ammonium ion, an alkylammonium ion, or a hydroxyalkylammonium ion. Examples of the alkali metal ion include a sodium ion and a lithium ion. Specific examples of an alkyl group as the alkylammonium ion include a methyl group, an ethyl group, an n-propyl group, an isopropyl group, an n-butyl group, an

[Chemical Formula 18]

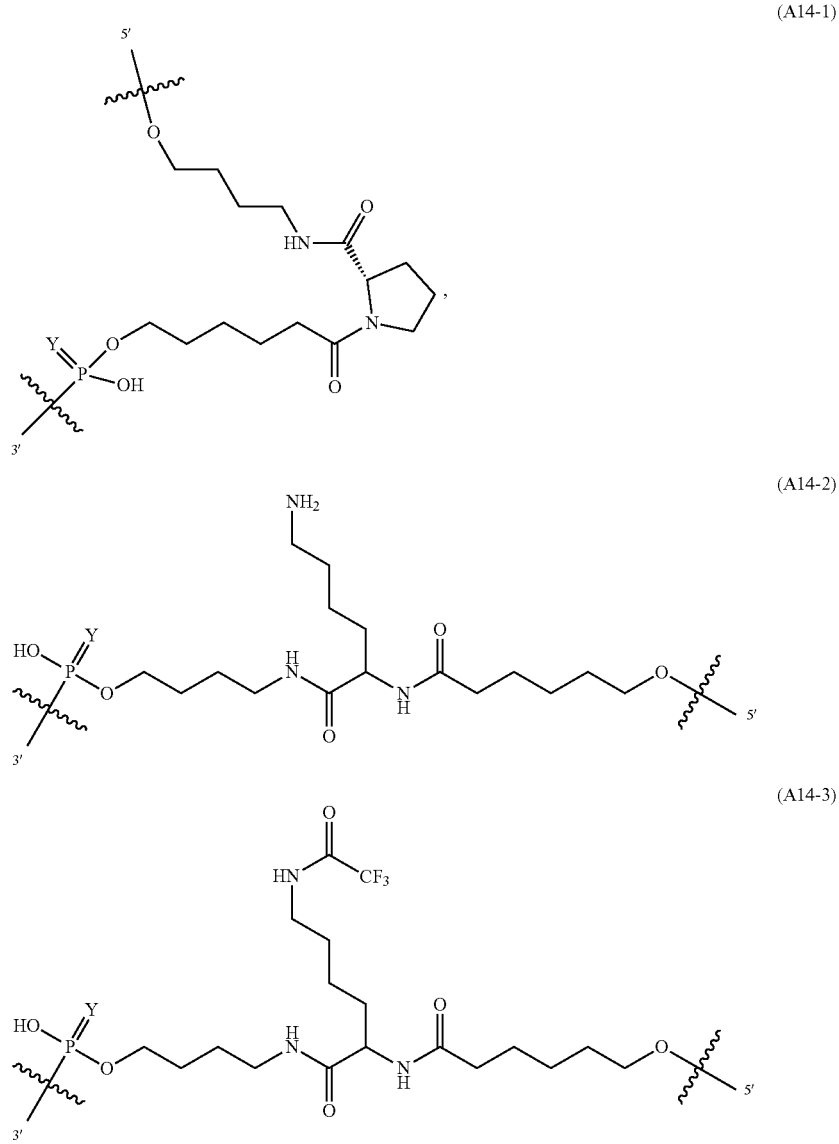

(A14-1)

(A14-2)

(A14-3)

wherein Y is as described above.

isobutyl group, a tert-butyl group, an n-pentyl group, an isopentyl group, and a hexyl group. More specific examples include a diethylammonium ion, a triethylammonium ion, a tetrabutylammonium ion, a hexylammonium ion, and a dibutylammonium ion. Specific examples of a hydroxyalkyl moiety as the hydroxyalkylammonium ion include hydroxymethyl, hydroxyethyl, hydroxy-n-propyl, hydroxyisopropyl, hydroxy-n-butyl, and trishydroxymethyl. More specific examples of the hydroxyalkylammonium ion include a trishydroxymethylammonium ion. $G^4$ preferably represents a hydrogen atom.

$G^5$ represents a hydrogen atom or the protecting group of a hydroxyl group, and when $G^5$ represents the protecting group, $G^1$ also represents the same protecting group. $G^5$ is a hydrogen atom when deprotection is performed, but the nucleotide compound in that case is also subjected to a series of nucleic acid elongation reaction steps.

Y is preferably an oxygen atom.

In $W_1$ and $X_1$, preferably, $W_1$ represents an OZ group, and $X_1$ represents an R group.

In $W_2$ and $X_2$, preferably, $W_2$ represents a hydroxyl group, and $X_2$ represents an R group.

$W_3$ and $X_3$ preferably each independently represent a hydroxyl group.

R' is preferably a hydroxyl group.

In the synthesis of the nucleic acid compound by an amidite method in the steps (1) to (5), a nucleic acid elongation reaction can be performed according to a generally known method (for example, the method described in JP-B-5157168 or JP-B-5554881) except for the deprotection step according to the present invention in the step (1) or the step (5) in the scheme of FIG. 1. Each step will be described below.

(Nucleic Acid Elongation Reaction)

In the present specification, the "nucleic acid elongation reaction" means a reaction in which oligonucleotides are elongated by sequentially bonding nucleotides via a phosphodiester bond. The nucleic acid elongation reaction can be performed according to a general procedure of a phosphoramidite method. The nucleic acid elongation reaction may be performed using, for example, an automated nucleic acid synthesizer adopting a phosphoramidite method.

The chain length of the nucleic acid oligomer may be, for example, 20 mer or more (that is, n≥19), 40 mer or more (that is, n≥39), 50 mer or more (that is, n≥49), 60 mer or more (that is, n24 59), 80 mer or more (that is, n≥79), 100 mer or more (that is, n≥99), 2 to 200 mer (that is, 1≤n≤199), 10 to 150 mer (that is, 9≤n≤149), or 15 to 110 mer (that is, 14≤n≤109).

The deprotection step of the step (1) is a step of deprotecting a protecting group of a 5'-hydroxyl group at the end of the oligonucleotide chain supported on the solid support. As a general protecting group, a 4,4'-dimethoxytrityl group (DMTr group), a 4-monomethoxytrityl group, or a 4,4',4"-trimethoxytrityl group is used. Deprotection can be performed using an acid. Examples of the acid for deprotection include trifluoroacetic acid, dichloroacetic acid, trifluoromethanesulfonic acid, trichloroacetic acid, methanesulfonic acid, hydrochloric acid, acetic acid, and p-toluenesulfonic acid.

The coupling step of the step (2) is a reaction in which a nucleoside phosphoramidite represented by Formula (13) below, shown in Scheme A of FIG. 1, is bonded to the 5'-hydroxyl group at the end of the oligonucleotide chain deprotected in the deprotection step. As the phosphoramidite used for nucleic acid elongation, an amidite compound represented by Formula (13) or (A9) to (A12) is used. Other examples of the phosphoramidite that can be used include 2'-OMe, 2'-F, a 2'-O-tert-butyldimethylsilyl group, a 2'-O-methoxyethyl group, 2'-H, and a 2'-fluoro-2'-deoxy-β-D-arabinofuranosyl group. As the nucleoside phosphoramidite, one including a 5'-hydroxyl group protected with a protecting group (for example, a DMTr group) is used. The coupling step can be performed using an activating agent or a coupling agent that activates the nucleoside phosphoramidite. Examples of the activating agent or coupling agent include 5-benzylthio-1H-tetrazole (BTT) (also referred to as 5-benzylmercapto-1H-tetrazole), 1H-tetrazole, 4,5-dicyanoimidazole (DCI), 5-ethylthio-1H-tetrazole (ETT), N-methylbenzimidazolium triflate (N-MeBIT), benzimidazolium triflate (BIT), N-phenylimidazolium triflate (N-PhIMT), imidazolium triflate (IMT), 5-nitrobenzimidazolium triflate (NBT), 1-hydroxybenzotriazole (HOBT), or 5-(bis-3,5-trifluoromethylphenyl)-1H-tetrazole.

The nucleoside phosphoramidite represented by Formula (13) (hereinafter referred to as amidite) shown in Scheme A in FIG. 1 is as follows:

a compound represented by Formula:

[Chemical Formula 19]

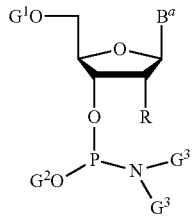

(13)

wherein $G^1$, $G^2$, $G^3$, $B^a$, and R are as described above.

After the coupling step, an unreacted 5'-hydroxyl group may be capped as appropriate. Capping can be performed using a known capping solution such as an acetic anhydride-tetrahydrofuran solution or a phenoxyacetic anhydride/N-methylimidazole solution.

The oxidation step of the step (3) is a step of converting the phosphite group formed in the coupling step into a phosphate group or a thiophosphate group. This step is a reaction of converting trivalent phosphite into pentavalent phosphate with an oxidizing agent, and the step can be performed by reacting the oxidizing agent with an oligonucleic acid derivative supported on the solid support.

When the phosphite group is converted into the phosphate group, for example, iodine can be used as the "oxidizing agent". The oxidizing agent can be prepared so as to have a concentration of 0.005 to 2 M and used. Water can be used as an oxygen source for oxidization, and pyridine, N-methylimidazole (NMI), N-methylmorpholine, triethylamine, or the like can be used as a base for allowing the reaction to proceed. The solvent is not particularly limited as long as it is not involved in the reaction, and examples thereof include acetonitrile, tetrahydrofuran (THF), or a mixed solvent in any ratio thereof. For example, a mixed solvent of iodine/water/pyridine/acetonitrile, a mixed solvent of iodine/water/pyridine, a mixed solvent of iodine/water/pyridine/NMI, or a mixed solvent of iodine/water/pyridine/THF can be used. The reaction temperature is preferably 5° C. to 50° C. The reaction time is usually suitably 1 minute to 30 minutes. The amount of the reagent to be used is preferably 1 to 100 mol, more preferably 1 to 10 mol, per 1 mol of the compound supported on the solid support.

In the case of converting a phosphite triester group to a thiophosphate triester group, as the "oxidizing agent", for example, sulfur, 3H-1,2-benzodithiol-3-one-1,1-dioxide (Beaucage reagent), 3-amino-1,2,4-dithiazole-5-thione (ADTT), 5-phenyl-3H-1,2,4-dithiazole-3-one (POS), [(N,N-dimethylaminomethylidene)amino]-3H-1,2,4-dithiazoline-3-thione (DDTT), and phenyl acetyl disulfide (PADS) can be used. The oxidizing agent can be used by being diluted with an appropriate solvent so as to have a concentration of 0.001 to 2 M. The solvent used for the reaction is not particularly limited as long as it is not involved in the reaction, and examples thereof include dichloromethane, acetonitrile, pyridine, or a mixed solvent in any ratio thereof. The oxidation step may be performed after the capping operation, or conversely, the capping operation may be performed after the oxidation step, and this order is not limited.

In the step (5-1), the protecting group of the hydroxyl group at the 5'-position of the nucleotide, introduced at the end of elongation may be used for column purification using the protecting group of the hydroxyl group at the 5'-position as a tag after cutting out from the solid support described later and deprotecting the protecting group, or the protecting group of the hydroxyl group at the 5'-position may be deprotected after column purification.

In the step (5-2), in the process of deprotecting the phosphate protecting group, after the synthesis of the nucleic acid having a desired sequence is completed, an amine compound is allowed to act in order to deprotect the protecting group of the phosphate moiety. Examples of the amine compound include diethylamine described in JP-B-4705716.

In the step (5-2), cutting out of the nucleic acid oligomer elongated to a desired chain length on the solid support from the solid support is usually performed using concentrated aqueous ammonia as a cutting agent.

Further, for example, the oligonucleotide chain is cut out from the solid support by using ammonia, an amine compound or the like, and recovered. Examples of the amine compound include methylamine, ethylamine, isopropylamine, ethylenediamine, and diethylamine.

In the step (5-3), the protecting group of the hydroxyl group at the 2'-position or 3'-position of ribose of the nucleic acid compound (4) cut out from the solid support in the step (5-2) can be removed according to the method described in WO 2006/022323 A, WO 2013/027843 A, or WO 2019/208571 A, and a deprotected nucleic acid oligomer (5) can be obtained.

Examples of the nucleic acid oligomer that can be produced by the production method of the present invention include, but are not limited to, nucleic acid oligomers including RNA, DNA, and RNA having 2'-O-MOE, 2'-O-Me, and 2'-F, and LNA, as nucleosides included therein. Various nucleosides are exemplified, such as those described in Xiulong, Shen et al., Nucleic Acids Research, 2018, Vol. 46, No. 46, page 1584 to 1600, and Daniel O'Reilly et al., Nucleic Acids Research, 2019, Vol. 47, No. 2, page 546 to 558. Preferably, the nucleic acid oligomer produced by the method of the present invention is RNA.

Typical examples of the nucleic acid oligomer usable in the production method of the present invention are shown in the following examples, in addition to the examples described in Examples, but are not limited thereto.

Hereinafter, in the description of the sequence, U represents uridine, C represents cytidine, A represents adenosine, and G represents guanosine.

The nucleic acid oligomers having the following sequences (A) and (B), described in WO 2019/060442 A are exemplified.

```
Sequence (A):
                                        (SEQ ID NO: 1)
5'-AUGGAAUmACUCUUGGUUmACdTdT-3'
(Antisense) 21 mer Sequence (B):
                                        (SEQ ID NO 2)
5'-GUmAACmCmAAGAGUmAUmUmCmCmAUmdTdT-3'
(Sense) 21 mer
```

In the sequences (A) and (B), Um represents 2'-O-methyluridine, Cm represents 2'-O-methylcytidine, and dT represents thymidine.

The nucleic acid oligomers described in Daniel O'Reilly et al., Nucleic Acids Research, 2019, Vol. 47, No. 2, page 546 to 558 (see, page 553) are exemplified. Typical examples thereof include nucleic acid oligomers having the following sequence (C).

```
Sequence (C):
                                        (SEQ ID NO: 3)
5'-AGAGCCAGCCUUCUUAUUGUUUUAGAGCUAUGCUGU-3'
36 mer
```

The nucleic acid oligomers described in JP-B-4965745 are exemplified. Typical examples thereof include nucleic acid oligomers having the following sequence (D).

```
Sequence (D):
                                (SEQ ID NOs: 4 and 5)
5'-CCAUGAGAAGUAUGACAACAGCC-P-

GGCUGUUGUCAUACUUCUCAUGGUU-3' 49 mer
```

In the sequence (D), "P" is represented by a partial structure delimited by wavy lines in Formula (A5) below.

The description of SEQ ID NO: 4 in the Sequence Listing indicates the base sequence of the following sequence (D1), which is the base sequence from the 5'-end to the base before "P" of the sequence (D). The description of SEQ ID NO: 5 indicates the base sequence of the following sequence (D2), which is the base sequence from the base after "P" to the 3'-end of the sequence (D).

```
Sequence (D1):
                                        (SEQ ID NO: 4)
5'-CCAUGAGAAGUAUGACAACAGCC-3' 23 mer Sequence (D2):
                                        (SEQ ID NO: 5)
5'-GGCUGUUGUCAUACUUCUCAUGGUU-3' 25 mer
```

The nucleic acid oligomers having the following sequence (E), described in Nucleic Acids Research, 2019, Vol. 47, No. 2: page 547 are exemplified.

```
Sequence (E):
                                        (SEQ ID NO: 6)
5'-ACAGCAUAGCAAGUUAAAAUAAGGCUAGUCCGUUAUCAACUUGAAA AAGUGGCACCGAGUCGGUGCU-3' 67 mer
```

The nucleic acid oligomers having the following sequence (F), described in JP-A-2015-523856, page 173 are exemplified.

Sequence (F):
(SEQ ID NO: 7)
5'-GUUUUCCCUUUUCAAAGAAAUCUCCUGGGCACCUAUCUUCUUAGGU

GCCCUCCCUUGUUUAAACCUGACCAGUUAACCGGCUGGUUAGGUUUUU-

3' 94 mer

The nucleic acid oligomers described in JP-A-2017-537626 are exemplified. Typical examples thereof include nucleic acid oligomers having the following sequences (G), (H), (I), and (J).

Sequence (G):
(SEQ ID NO: 8)
5'-AGUCCUCAUCUCCCUCAAGCGUUUUAGAGCUAGUAAUAGCAAGUUA

AAAUAAGGCUAGUCCGUUAUCAACUUGAAAAAGUGGCACCGAGUCGGUG

CUUUU-3' 100 mer

Sequence (H):
(SEQ ID NO: 9)
5'-GCAGAUGUAGUGUUUCCACAGUUUAAGAGCUAUGCUGGAAACAGCA

UAGCAAGUUUAAAUAAGGCUAGUCCGUUAUCAACUUGAAAAAGUGGCAC

CGAGUCGGUGCUUUUUUU-3' 113 mer

Sequence (I):
(SEQ ID NO: 10)
5'-dAdGdTdCdCdTdCdAdTdCdTdCdCdCdTdCdAdAdGdCGUUUAA

GAGCUAUGCUGGUAACAGCAUAGCAAGUUUAAAUAAGGCUAGUCCGUUA

UCAACUUGAAAAAGUGGCACCGAGUCGGUGCUUUUUUU-3' 113 mer

In the sequence (I), dT represents thymidine, dC represents 2'-deoxycytidine, dA represents 2'-deoxyadenosine, and dG represents 2'-deoxyguanosine.

Sequence (J):
(SEQ ID NO: 11)
5'-AmsGmsUmsCCUCAUCUCCCUCAAGCGUUUAAGAGCUAUGCUGGUA

ACAGCAUAGCAAGUUUAAAUAAGGCUAGUCCGUUAUCAACUUGAAAAAG

UGGCACCGAGUCGGUGCUUUUmsUmsUmsU-3' 113 mer

In the sequence (J), Um represents 2'-O-methyluridine, Am represents 2'-O-methyladenosine, Gm represents 2'-O-methylguanosine, and s represents phosphorothioate modification.

EXAMPLES

Hereinafter, the present invention will be described in more detail with reference to Examples, but the present invention is not limited to these Examples.

<Measurement Method>

First, various measurement methods used in the following test are shown below.

The oligonucleotide purity was measured by high performance liquid chromatography (HPLC).

The HPLC measurement conditions are shown in Table 1 below.

(Measurement Method 1: Measurement of Oligonucleotide Purity)

TABLE 1

| | |
|---|---|
| Column | DNAPacTM PA200 4 × 250 mm |
| Flow rate | 1.0 mL/min |
| Detection wavelength | 2 60 nm |
| Mobile phase A | 25 mM Tris-HCl buffer (pH = 8.0), 10% $CH_3CN$, 6M Urea water |
| Mobile phase B | 500 mM $NaClO_4$, 25 mM Tris-HCl buffer (pH = 8.0), 10% $CH_3CN$, 6M Urea water |
| Gradient condition | B conc. 20% (0 min)-60% (60 min)-90% (60.01 min)-90% (65 min)-20% (65.01 min)-20% (80 min) |
| Column temperature | 80° C. |

(Measurement Method 2: Measurement of Oligonucleotide Yield)

The $OD_{260}$ of the crude product was measured. The $OD_{260}$ represents an absorbance at UV 260 nm per 10 mm optical path length in a 1 mL solution (pH=7.5). Since it is generally known that 1 OD is 40 µg in RNA, the yield was calculated based on the measured value of the $OD_{260}$.

(Measurement Method 3: Measurement of Formaldehyde Concentration)

A method for measuring the concentration of formaldehyde in the dichloroacetic acid solution includes gas chromatography and high performance liquid chromatography. In gas chromatography, formaldehyde is directly analyzed, and the concentration thereof is calculated. In high performance liquid chromatography, formaldehyde and acetylacetone are reacted, the amount of 3,5-diacetyl-1,4-dihydrolutidine obtained is measured, and the formaldehyde concentration is calculated.

<Preparation of Dichloroacetic Acid Solution>

Dichloroacetic acid solutions having different formaldehyde concentrations used in the following test were each prepared by preparing a dichloroacetic acid solution having a low formaldehyde concentration in advance, and adding an aqueous formaldehyde solution to the obtained dichloroacetic acid solution.

<Solid-Phase Synthesis of Oligonucleotide>

Sequence (I):
(SEQ ID NO: 12)
5'-GGCACCGAGUCGGUGCUUUU-3' 20 mer

Sequence (II):
(SEQ ID NO: 13)
5'-AAGGCUAGUCCGUUAUCAACUUGAAAAAGUGGCACCGAGUCGGUGC UUUU-3' 50 mer Sequence (III):
(SEQ ID NO: 14)
5'-AUAACUCAAUUUGUAAAAAAGUUUUAGAGCUAGAAAUAGCAAGUUA

AAAUAAGGCUAGUCCGUUAUCAACUUGAAAAAGUGGCACCGAGUCGGUG

CUUUU-3' 100 mer

In the sequences (I), (II) and (III), "A" is represented by a partial structure delimited by wavy lines in Formula (A1) below. "C" is represented by a partial structure delimited by wavy lines in Formula (A2) below. "G" is represented by a partial structure delimited by wavy lines in Formula (A3) below. "U" is represented by a partial structure delimited by wavy lines in Formula (A4) below. "U" at the 3'-end is represented by a partial structure delimited by wavy lines in Formula (A8) below. In the sequence (I), "G" at the 5-' end is represented by a partial structure delimited by wavy lines in Formula (A6) below, and in the sequences (II) and (III), "A" at the 5'-end is represented by a partial structure delimited by wavy lines in Formula (A7) below.
[Chemical Formula 20]
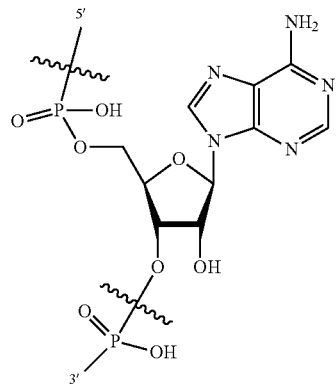
(A1)
[Chemical Formula 21]
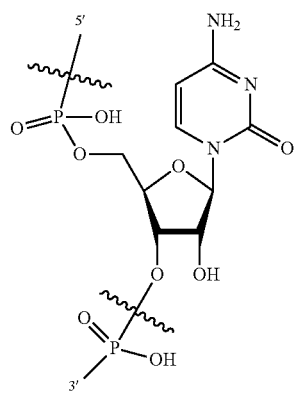
(A2)
[Chemical Formula 22]
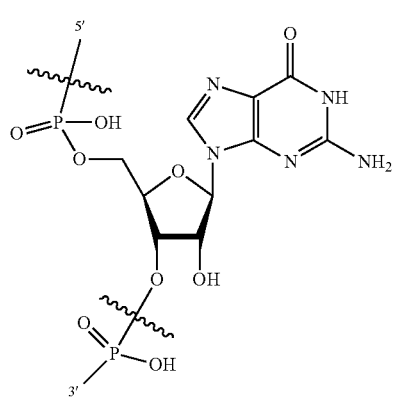
(A3)
[Chemical Formula 23]
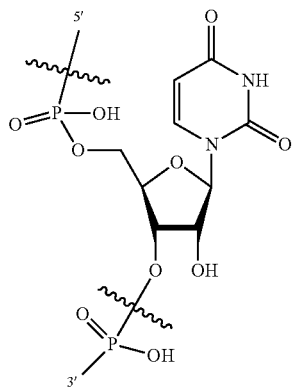
(A4)
[Chemical Formula 24]
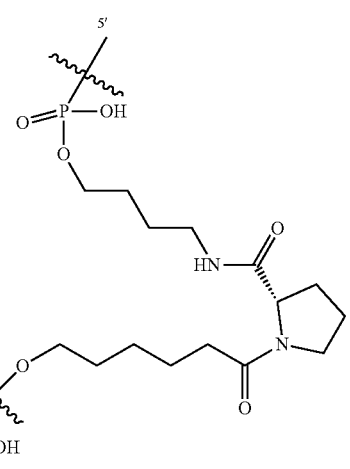
(A5)
[Chemical Formula 25]
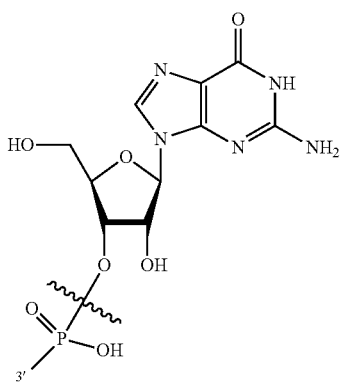
(A6)

-continued

[Chemical Formula 26] (A7)

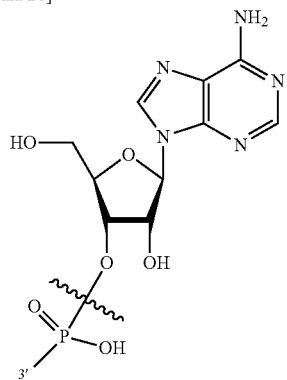

[Chemical Formula 27] (A8)

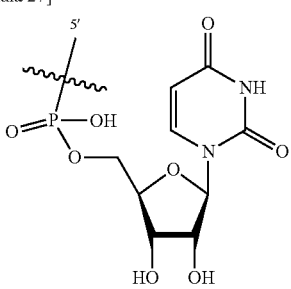

An oligonucleotide having the sequences (I), (II) and (III) was synthesized from the 3-'side toward the 5'-side by phosphoramidite solid-phase synthesis, using controlled pore glass (CPG) as a solid support and NTS M-4MX-E (manufactured by Nihon Techno Service Co., Ltd.) as a nucleic acid synthesizer. The synthesis was carried out at a scale of about 1 μmol. In the synthesis, uridine EMM amidite (A11) described in Example 2 of US 2012/0035246, cytidine EMM amidite (A9) described in Example 3, adenosine EMM amidite (A12) described in Example 4, and guanosine EMM amidite (A10) described in Example 5 were used; a 3% dichloroacetic acid toluene solution was used as a deblocking solution; 5-benzylmercapto-1H-tetrazole was used as a coupling agent; an iodine solution was used as an oxidizing agent; and a phenoxyacetic anhydride solution and an N-methylimidazole solution were used as capping solutions.

[Chemical Formula 28] (A9)

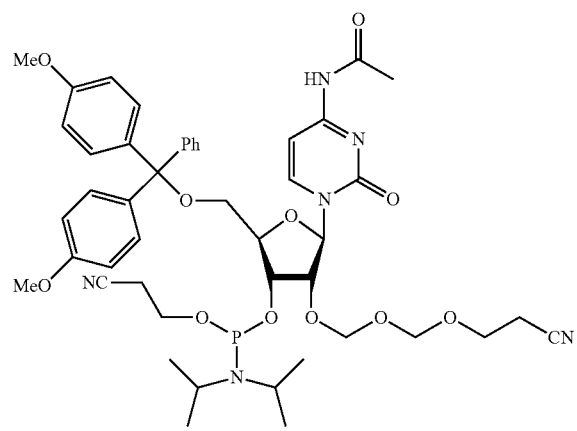

-continued

[Chemical Formula 29] (A10)

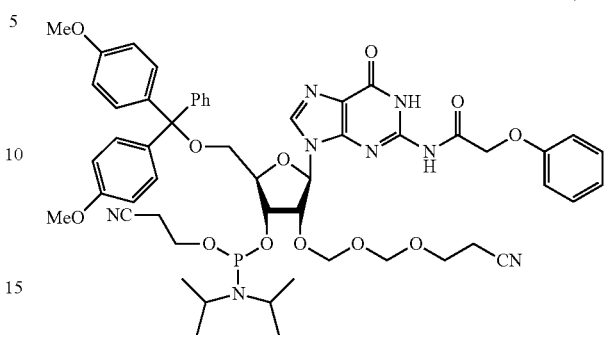

[Chemical Formula 30] (A11)

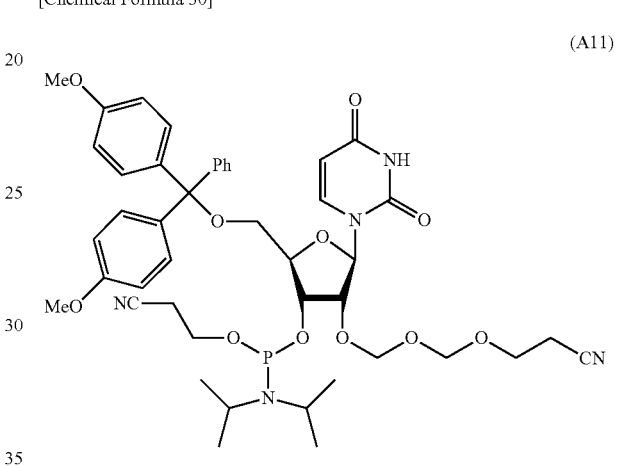

[Chemical Formula 31] (A12)

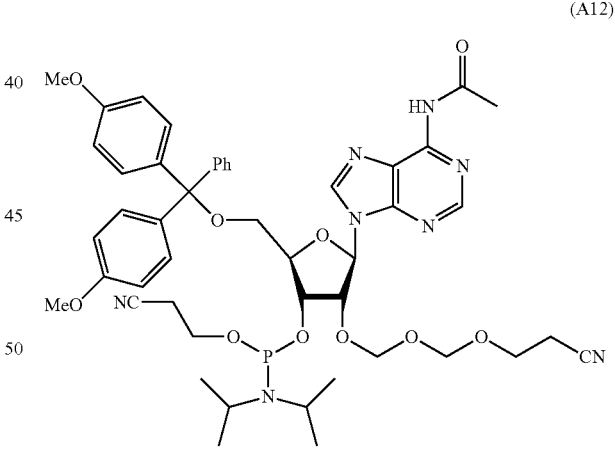

Next, specific production examples of the oligonucleotides (nucleic acid oligomers) produced by the production method of the present invention will be described. Here, the oligonucleotides produced by the production method of the present invention in the following Examples are oligonucleotides having the sequences (I), (II), or (III).

The uridine derivative described in the following Examples and Comparative Examples means a compound represented by the following structural formula. The circle illustrated in the following structural formula schematically indicates CPG.

[Chemical Formula 32]

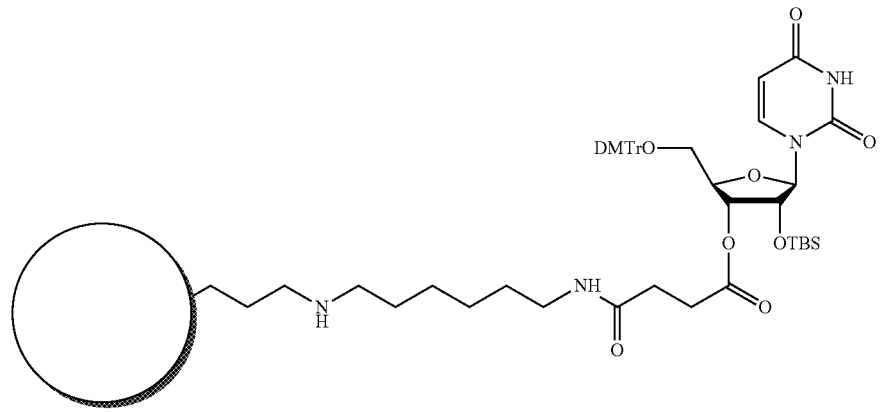

Example 1

A nucleic acid oligomer represented by the sequence (I) was automatically synthesized from the 3-'side toward the 5'-side by NTS M-4MX-E (manufactured by Nihon Techno Service Co., Ltd.), using controlled pore glass (CPG) supporting 0.98 μmol of a uridine derivative, and an amidite represented by Formula (A9), (A10), (A11), or (A12). In the procedure of automatic synthesis, first, a 3% dichloroacetic acid toluene solution was fed to CPG to deprotect the trityl protecting group at the 5'-position. At this time, the formaldehyde concentration in the dichloroacetic acid solution used could be measured by the measurement method 3, and the molar ratio of formaldehyde to dichloroacetic acid (formaldehyde mol/dichloroacetic acid mol) in the dichloroacetic acid solution was $43 \times 10^{-7}$. Subsequently, various amidites and 5-benzylmercapto-1H-tetrazole as a coupling agent were fed to CPG to allow a coupling reaction with the hydroxyl group at the 5'-position to proceed. Subsequently, an oxidation solution containing 50 mM iodine was fed to CPG to convert a phosphite group into a phosphate group. Subsequently, a 0.1 M phenoxyacetic anhydride acetonitrile solution and a 10% N-methylimidazole/10% 2,6-lutidine acetonitrile solution were used as capping solutions, and capping was performed at reaction points where coupling did not proceed. Further, after repeating these processes 19 times in total, the protecting group (DMTr group) of the base at the 5'-end was deprotected with a 3% dichloroacetic acid toluene solution, and a nucleic acid oligonucleotide having a sequence represented by the sequence (I) was synthesized on the CPG support. Thereafter, 1.5 mL of 28% aqueous ammonia and 0.5 mL of ethanol were added to the CPG support supporting 0.98 μmol of the oligonucleotide, and the mixture was incubated at 40° C. for 4 hours, to thereby release the nucleic acid oligomer from the solid support, and the solvent was then removed by concentration. Subsequently, the free oligonucleotide was dissolved in 1.5 mL of dimethyl sulfoxide, and then 1.0 mL of acetonitrile, 20 μL of nitromethane, and a stirring bar were added therein. Thereafter, 2.08 mL of a 1 M solution of tetra-n-butylammonium fluoride (TBAF) in dimethyl sulfoxide, which had been subjected to a dehydration treatment with molecular sieve 4A, was added at room temperature under stirring with a stirrer, and the mixture was incubated at 33° C. for 4 hours to deprotect the 2'-EMM protecting group. Thereafter, a product of the nucleic acid oligomer was obtained by precipitation operation. As a result of measuring the purity of the oligonucleotide of the obtained product by the method described in the measurement method 1, the purity was 76.2%. In addition, when the yield of the oligonucleotide was measured by the method described in the measurement method 2, the yield was 4,032 μg, which was 4,114 μg in terms of yield per CPG supporting 1.00 μmol of a uridine derivative. The results are shown in Table 2.

Example 2

A nucleic acid oligomer of the sequence (I) was obtained in the same manner as in the experiment of Example 1 except that controlled pore glass (CPG) supporting 1.02 μmol of a uridine derivative and a 3% dichloroacetic acid toluene solution having a molar ratio of formaldehyde to dichloroacetic acid (formaldehyde mol/dichloroacetic acid mol) of $90 \times 10^{-6}$ were used. As a result of measuring the purity of the oligonucleotide by the method described in the measurement method 1, the purity of the product was 75.0%. In addition, when the yield of the oligonucleotide was measured by the method described in the measurement method 2, the yield was 4,147 μg, which was 4,066 μg in terms of yield per CPG supporting 1.00 μmol of a uridine derivative. The results are shown in Table 2.

Reference Example 1

A nucleic acid oligomer of the sequence (I) was obtained in the same manner as in the experiment of Example 1 except that controlled pore glass (CPG) supporting 1.03 μmol of a uridine derivative and a 3% dichloroacetic acid toluene solution having a molar ratio of formaldehyde to dichloroacetic acid (formaldehyde mol/dichloroacetic acid mol) of $20 \times 10^{-5}$ were used. As a result of measuring the purity of the oligonucleotide by the method described in the measurement method 1, the purity of the product was 73.8%. In addition, when the yield of the oligonucleotide was measured by the method described in the measurement method 2, the yield was 3,979 μg, which was 3,863 μg in terms of yield per CPG supporting 1.00 μmol of a uridine derivative. The results are shown in Table 2.

Example 3

A nucleic acid oligomer represented by the sequence (II) was automatically synthesized from the 3-'side toward the 5'-side by NTS M-4MX-E (manufactured by Nihon Techno Service Co., Ltd.), using controlled pore glass (CPG) supporting 1.03 µmol of a uridine derivative, and an amidite represented by Formula (A9), (A10), (A11), or (A12). In the procedure of automatic synthesis, first, a 3% dichloroacetic acid toluene solution was fed to CPG to deprotect the trityl protecting group at the 5'-position. At this time, the formaldehyde concentration in the dichloroacetic acid solution used could be measured by the measurement method 3, and the molar ratio of formaldehyde to dichloroacetic acid (formaldehyde mol/dichloroacetic acid mol) in the dichloroacetic acid solution was $43 \times 10^{-7}$. Subsequently, various amidites and 5-benzylmercapto-1H-tetrazole as a coupling agent were fed to CPG to allow a coupling reaction with the hydroxyl group at the 5'-position to proceed. Subsequently, an oxidation solution containing 50 mM iodine was fed to CPG to convert a phosphite group into a phosphate group. Subsequently, a 0.1 M phenoxyacetic anhydride acetonitrile solution and a 10% N-methylimidazole/10% 2,6-lutidine acetonitrile solution were used as capping solutions, and capping was performed at reaction points where coupling did not proceed. Further, after repeating these processes 49 times in total, the protecting group (DMTr group) of the base at the 5'-end was deprotected with a 3% dichloroacetic acid toluene solution, and a nucleic acid oligonucleotide having a sequence represented by the sequence (II) was synthesized on the CPG support. Thereafter, 1.5 mL of 28% aqueous ammonia and 0.5 mL of ethanol were added to the CPG support supporting 1.03 µmol of the oligonucleotide, and the mixture was incubated at 40° C. for 4 hours, to thereby release the nucleic acid oligomer from the solid support, and the solvent was then removed by concentration. Subsequently, the free oligonucleotide was dissolved in 1.5 mL of dimethyl sulfoxide, and then 1.0 mL of acetonitrile, 20 µL of nitromethane, and a stirring bar were added therein. Thereafter, 2.08 mL of a 1 M solution of tetra-n-butylammonium fluoride (TBAF) in dimethyl sulfoxide, which had been subjected to a dehydration treatment with molecular sieve 4A, was added at room temperature under stirring with a stirrer, and the mixture was incubated at 33° C. for 4 hours to deprotect the 2'-EMM protecting group. Thereafter, a product of the nucleic acid oligomer was obtained by precipitation operation. As a result of measuring the purity of the oligonucleotide of the obtained product by the method described in the measurement method 1, the purity was 50.8%. In addition, when the yield of the oligonucleotide was measured by the method described in the measurement method 2, the yield was 9,156 µg, which was 8,889 µg in terms of yield per CPG supporting 1.00 µmol of a uridine derivative. The results are shown in Table 2.

Example 4

A nucleic acid oligomer of the sequence (II) was obtained in the same manner as in the experiment of Example 3 except that controlled pore glass (CPG) supporting 1.05 µmol of a uridine derivative and a 3% dichloroacetic acid toluene solution having a molar ratio of formaldehyde to dichloroacetic acid (formaldehyde mol/dichloroacetic acid mol) of $90 \times 10^{-6}$ were used. As a result of measuring the purity of the oligonucleotide by the method described in the measurement method 1, the purity of the product was 47.8%. In addition, when the yield of the oligonucleotide was measured by the method described in the measurement method 2, the yield was 9,378 µg, which was 8,931 µg in terms of yield per CPG supporting 1.00 µmol of a uridine derivative. The results are shown in Table 2.

Reference Example 2

A nucleic acid oligomer of the sequence (II) was obtained in the same manner as in the experiment of Example 3 except that controlled pore glass (CPG) supporting 1.05 µmol of a uridine derivative and a 3% dichloroacetic acid toluene solution having a molar ratio of formaldehyde to dichloroacetic acid (formaldehyde mol/dichloroacetic acid mol) of $20 \times 10^{-5}$ were used. As a result of measuring the purity of the oligonucleotide by the method described in the measurement method 1, the purity of the product was 42.8%. In addition, when the yield of the oligonucleotide was measured by the method described in the measurement method 2, the yield was 9,307 µg, which was 8,864 µg in terms of yield per CPG supporting 1.00 µmol of a uridine derivative. The results are shown in Table 2.

Example 5

A nucleic acid oligomer represented by the sequence (III) was automatically synthesized from the 3-'side toward the 5'-side by NTS M-4MX-E (manufactured by Nihon Techno Service Co., Ltd.), using controlled pore glass (CPG) supporting 0.99 µmol of a uridine derivative, and an amidite represented by Formula (A9), (A10), (A11), or (A12). In the procedure of automatic synthesis, first, a 3% dichloroacetic acid toluene solution was fed to CPG to deprotect the trityl protecting group at the 5'-position. At this time, the formaldehyde concentration in the dichloroacetic acid solution used could be measured by the measurement method 3, and the molar ratio of formaldehyde to dichloroacetic acid (formaldehyde mol/dichloroacetic acid mol) in the dichloroacetic acid solution was $43 \times 10^{-7}$. Subsequently, various amidites and 5-benzylmercapto-1H-tetrazole as a coupling agent were fed to CPG to allow a coupling reaction with the hydroxyl group at the 5'-position to proceed. Subsequently, an oxidation solution containing 50 mM iodine was fed to CPG to convert a phosphite group into a phosphate group. Subsequently, a 0.1 M phenoxyacetic anhydride acetonitrile solution and a 10% N-methylimidazole/10% 2,6-lutidine acetonitrile solution were used as capping solutions, and capping was performed at reaction points where coupling did not proceed. Further, after repeating these processes 99 times in total, the protecting group (DMTr group) of the base at the 5'-end was deprotected with a 3% dichloroacetic acid toluene solution, and a nucleic acid oligonucleotide having a sequence represented by the sequence (III) was synthesized on the CPG support. Thereafter, 1.5 mL of 28% aqueous ammonia and 0.5 mL of ethanol were added to the CPG support supporting 1.03 µmol of the oligonucleotide, and the mixture was incubated at 40° C. for 4 hours, to thereby release the nucleic acid oligomer from the solid support, and the solvent was then removed by concentration. Subsequently, the free oligonucleotide was dissolved in 1.5 mL of dimethyl sulfoxide, and then 1.0 mL of acetonitrile, 20 µL of nitromethane, and a stirring bar were added therein. Thereafter, 2.08 mL of a 1 M solution of tetra-n-butylammonium fluoride (TBAF) in dimethyl sulfoxide, which had been subjected to a dehydration treatment with molecular sieve 4A, was added at room temperature under stirring with a stirrer, and the mixture was incubated at 33° C. for 4 hours to deprotect the 2'-EMM protecting group. Thereafter, a product of the nucleic acid oligomer was obtained by precipitation operation. As a result of measuring the purity of the oligonucleotide of the obtained product by the method described in the measurement method 1, the purity was 33.1%. In addition, when the yield of the oligonucleotides was measured by the method described in the measurement method 2, the yield was 12,889 μg, which was 13,019 μg in terms of yield per CPG supporting 1.00 μmol of a uridine derivative. The results are shown in Table 2.

Example 6

A nucleic acid oligomer of the sequence (III) was obtained in the same manner as in the experiment of Example 5 except that controlled pore glass (CPG) supporting 1.04 μmol of a uridine derivative and a 3% dichloroacetic acid toluene solution having a molar ratio of formaldehyde to dichloroacetic acid (formaldehyde mol/dichloroacetic acid mol) of $90 \times 10^{-6}$ were used. As a result of measuring the purity of the oligonucleotide by the method described in the measurement method 1, the purity of the product was 29.7%. In addition, when the yield of the oligonucleotides was measured by the method described in the measurement method 2, the yield was 13,375 μg, which was 12,861 μg in terms of yield per CPG supporting 1.00 μmol of a uridine derivative. The results are shown in Table 2.

Reference Example 3

A nucleic acid oligomer of the sequence (III) was obtained in the same manner as in the experiment of Example 5 except that controlled pore glass (CPG) supporting 0.99 μmol of a uridine derivative and a 3% dichloroacetic acid toluene solution having a molar ratio of formaldehyde to dichloroacetic acid (formaldehyde mol/dichloroacetic acid mol) of $20 \times 10^{-5}$ were used. As a result of measuring the purity of the oligonucleotide by the method described in the measurement method 1, the purity of the product was 26.4%. In addition, when the yield of the oligonucleotides was measured by the method described in the measurement method 2, the yield was 12,675 μg, which was 12,803 μg in terms of yield per CPG supporting 1.00 μmol of a uridine derivative. The results are shown in Table 2.

Example 7

To 30 g of a dichloroacetic acid solution having a molar ratio of formaldehyde to dichloroacetic acid (formaldehyde mol/dichloroacetic acid mol) of $25 \times 10^{-5}$, 300 mL of toluene was added, and toluene and formaldehyde were azeotropically distilled off at 40° C. using an evaporator, to obtain 34 g of a slightly yellow oily dichloroacetic acid solution. Formaldehyde contained in the obtained dichloroacetic acid solution was analyzed by the method described in the measurement method 3, and the molar ratio of formaldehyde to dichloroacetic acid was $43 \times 10^{-7}$.

TABLE 2

| | Sequence in synthesis | Molar ratio of formaldehyde/ dichloroacetic acid | Yield (μg/μmol) | Purity of product (%) | Net yield (yield × purity of product) | Relative value of net yield |
|---|---|---|---|---|---|---|
| Example 1 | Sequence (I) | $43 \times 10^{-7}$ | 4114 | 76.2 | 3135 | 1.10 |
| Example 2 | Sequence (I) | $90 \times 10^{-6}$ | 4066 | 75.0 | 3050 | 1.07 |
| Reference Example 1 | Sequence (I) | $20 \times 10^{-5}$ | 3863 | 73.8 | 2851 | 1.00 |
| Example 3 | Sequence (II) | $43 \times 10^{-7}$ | 8889 | 50.8 | 4516 | 1.19 |
| Example 4 | Sequence (II) | $90 \times 10^{-6}$ | 8931 | 47.8 | 4269 | 1.13 |
| Reference Example 2 | Sequence (II) | $20 \times 10^{-5}$ | 8864 | 42.8 | 3794 | 1.00 |
| Example 5 | Sequence (III) | $43 \times 10^{-7}$ | 13019 | 33.1 | 4309 | 1.27 |
| Example 6 | Sequence (III) | $90 \times 10^{-6}$ | 12861 | 29.7 | 3820 | 1.13 |
| Reference Example 3 | Sequence (III) | $20 \times 10^{5}$ | 12803 | 26.4 | 3380 | 1.00 |

From the results in Table 2 above, when the dichloroacetic acid solution of the present invention, having a formaldehyde concentration equal to or less than a certain value was used, a nucleic acid oligomer was obtained in a higher yield as compared with the case of using the dichloroacetic acid solutions of Reference Examples 1, 2, and 3.

INDUSTRIAL APPLICABILITY

The present invention provides a method for efficiently producing a nucleic acid oligomer. In addition, improvement in the yield of the nucleic acid oligomer produced according to the method for producing a nucleic acid oligomer can be expected.

Sequence Listing Free Text

SEQ ID NOS: 1 to 14 in the Sequence Listing represent the base sequences of oligonucleotides produced according to the production method of the present invention.

The invention claimed is:

1. A method for producing a nucleic acid oligomer represented by the following formula (2), the method comprising:

reacting a nucleic acid oligomer represented by the following formula (1) with a dichloroacetic acid solution, wherein the dichloroacetic acid solution comprises dichloroacetic acid and formaldehyde, at a molar ratio of formaldehyde to dichloroacetic acid (formaldehyde mol/dichloroacetic acid mol) of $90 \times 10^{-6}$ or less:

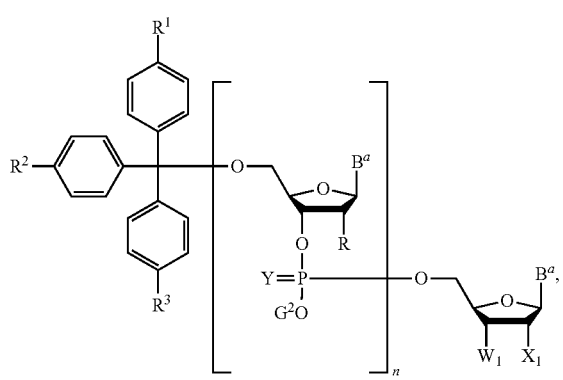

(1)

wherein $G^2$ represents a protecting group of a hydroxyl group, $B^a$ is the same or different and each independently represents a nucleobase which may be protected with a protecting group, $R^1$, $R^2$ and $R^3$ are the same or different and each independently represent a hydrogen atom or an alkoxy group, R is the same or different and each independently represents a protected hydroxyl group, a hydrogen atom, a fluorine atom, a methoxy group, a 2-methoxyethyl group, or an OQ' group, Q' is the same or different and each independently represents a methylene group bonded to a carbon atom at a 4'-position of ribose, an ethylene group bonded to a carbon atom at a 4'-position of ribose, or an ethylidene group bonded to a carbon atom at a 4'-position of ribose, Y is the same or different and each independently represents an oxygen atom or a sulfur atom, n represents an integer of from 1 to 200, $W_1$ represents an OZ group and $X_1$ represents an R group, or $W_1$ represents an OV group, and $X_1$ represents an OZ group, V represents a protecting group of a hydroxyl group, Z is a group having a structure including a solid support and a linking group, and when n is an integer of 2 or more, a non-nucleotide linker is optionally incorporated between respective nucleotides in the nucleic acid oligomer represented by the formula (1); and

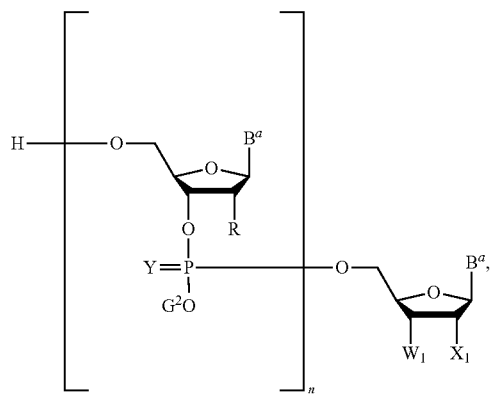

(2)

wherein $G^2$, $B^a$, R, Y, $X_1$, $W_1$, and n are as in the formula (1), and a non-nucleotide linker is optionally incorporated between respective nucleotides in the nucleic acid oligomer represented by the formula (2).

2. A method for producing a nucleic acid oligomer represented by the following formula (2'), the method comprising:

reacting a nucleic acid oligomer represented by the formula (1) with a dichloroacetic acid solution having a molar ratio of formaldehyde to dichloroacetic acid, formaldehyde mol/dichloroacetic acid mol, of $90 \times 10^{-6}$ or less:

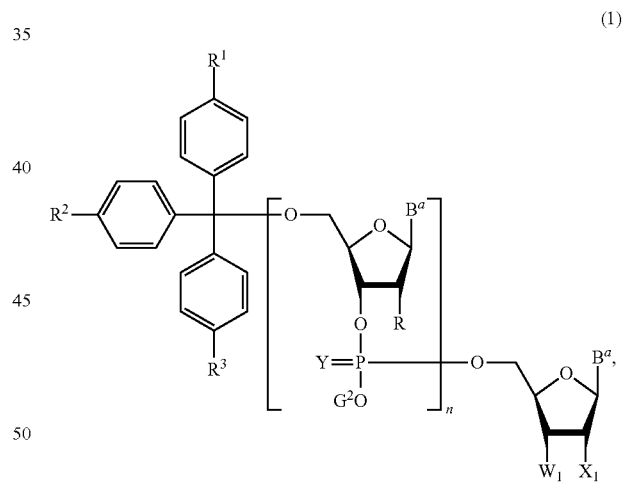

(1)

wherein $G^2$ represents a protecting group of a hydroxyl group, $B^a$ is the same or different and each independently represents a nucleobase which optionally protected with a protecting group, $R^1$, $R^2$ and $R^3$ are the same or different and each independently represent a hydrogen atom or an alkoxy group, R is the same or different and each independently represents a protected hydroxyl group, a hydrogen atom, a fluorine atom, a methoxy group, a 2-methoxyethyl group, or an OQ' group, Q' is the same or different and each independently represents a methylene group bonded to a carbon atom at a 4'-position of ribose, an ethylene group bonded to a carbon atom at a 4'-position of ribose, or an ethylidene group bonded to a carbon atom at a 4'-position of ribose, Y is the same or different and each independently represents an oxygen atom or a sulfur atom, n represents an integer of from 1 to 200, $W_1$ represents an OZ group and $X_1$ represents an R group, or $W_1$ represents an OV group, and $X_1$ represents an OZ group, V represents a protecting group of a hydroxyl group, Z is a group having a structure including a solid support and a linking group, and when n is an integer of 2 or more, a non-nucleotide linker is optionally incorporated between respective nucleotides in the nucleic acid oligomer represented by the formula (1); and

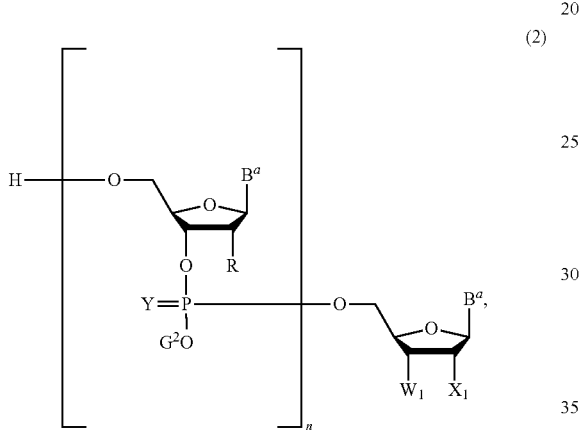

(2)

wherein $G^2$, $B^a$, R, Y, $X_1$, $W_1$, and n are as in the formula (1), and a non-nucleotide linker is optionally incorporated between respective nucleotides in the nucleic acid oligomer represented by the formula (2); removing a group represented by Z from the nucleic acid oligomer represented by the formula (2); and removing a protecting group of a hydroxyl group and a nucleobase:

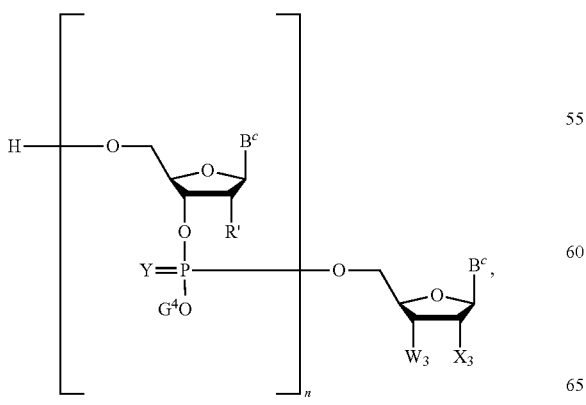

(2')

wherein

Y and n are as in the formula (1), $B^e$ is the same or different and each independently represents a nucleobase, $G^4$ is the same or different and each independently represents a hydrogen atom, an alkali metal ion, an ammonium ion, an alkylammonium ion, or a hydroxyalkylammonium ion, R' is the same or different and each independently represents a hydroxyl group, a hydrogen atom, a fluorine atom, a methoxy group, a 2-methoxyethyl group, or an OQ' group, Q' is as in the formula (1), $X_3$ and $W_3$ each independently represent a hydroxyl group, or $X_3$ represents an R' group, and $W_3$ represents a hydroxyl group.

3. The method according to claim 1, further comprising:

optionally elongating a chain length of the nucleic acid oligomer represented by the formula (2) by an amidite method, to produce a nucleic acid compound represented by the following formula (3); and cutting out a compound represented by the following formula (4) from the nucleic acid compound represented by the formula (3), and further deprotecting the compound represented by the formula (4), to produce a nucleic acid oligomer represented by the following formula (5):

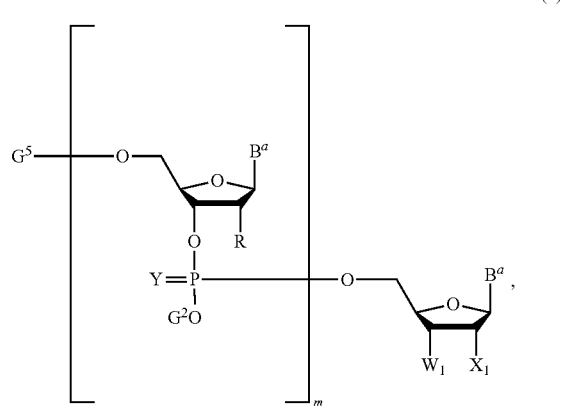

(3)

wherein $G^2$, $B^a$, R, Y, $X_1$, and $W_1$ are as in the formula (1), $G^5$ is a protecting group of a hydroxyl group represented by the following formula or a hydrogen atom;

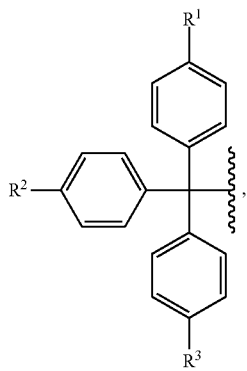

wherein $R^1$, $R^2$, and $R^3$ are as in the formula (1), and m is an integer satisfying m≥n;

(4)

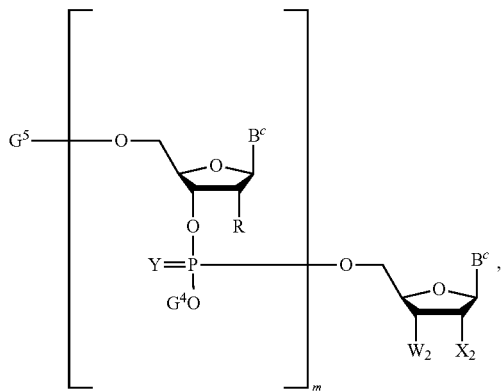

wherein
$G^5$, R, Y, and m are as in the formula (3),
$G^4$ is the same or different and each independently represents a hydrogen atom, an alkali metal ion, an ammonium ion, an alkylammonium ion, or a hydroxyalkylammonium ion,
$B^C$ is the same or different and each independently represents a nucleobase,
$X_2$ represents a hydroxyl group, and $W_2$ represents an OV group, or
$X_2$ represents an R group, and $W_2$ represents a hydroxyl group, and
V represents a protecting group of a hydroxyl group; and (5)

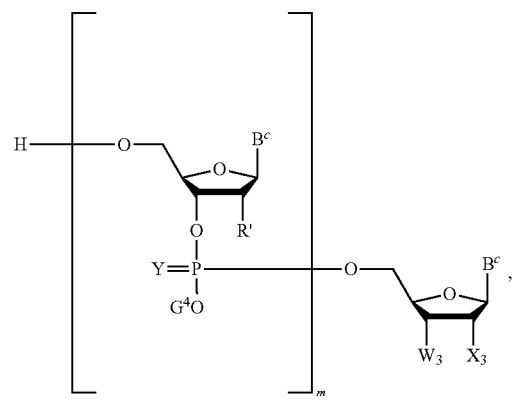

wherein
$G^4$, $B^e$, Y, and m are as in the formula (4),
R' is the same or different and each independently represents a hydroxyl group, a hydrogen atom, a fluorine atom, a methoxy group, a 2-methoxyethyl group, or an OQ' group,
Q' is as in the formula (1),
$X_3$ and $W_3$ each independently represent a hydroxyl group, or
$X_3$ represents an R' group, and $W_3$ represents a hydroxyl group.

4. The method according to claim 1, wherein the non-nucleotide linker is a linker including an amino acid skeleton.

5. The method according to claim 4, wherein the linker comprising an amino acid skeleton has a structure selected from the group consisting of the formulas (A14-1), (A14-2), and (A14-3):

(A14-1)

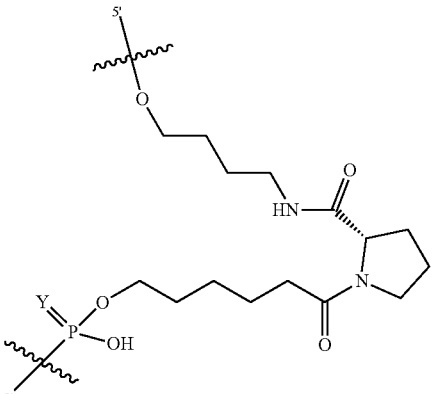

(A14-2)

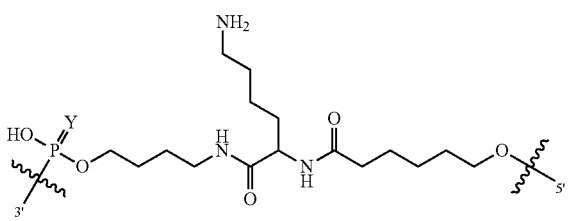

(A14-3)

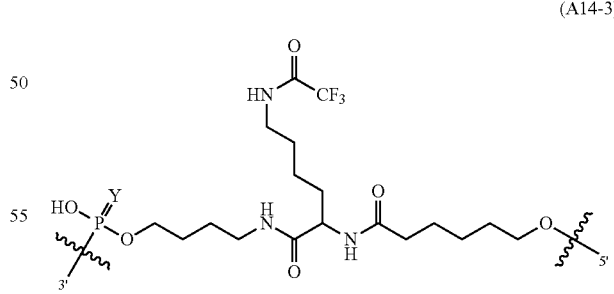

wherein Y is as in the formula (1).

6. The method according to claim 1, wherein the dichloroacetic acid solution comprises at least one solvent selected from the group consisting of dichloromethane, acetonitrile, and an aromatic organic solvent.

7. The method according to claim 1, wherein the molar ratio of formaldehyde to dichloroacetic acid is $43\times10^{-6}$ or less.

8. The method according to claim 1, wherein the molar ratio of formaldehyde to dichloroacetic acid is 22× 10-6 or less.

9. The method according to claim 1, wherein the nucleic acid oligomer is a ribonucleic acid (RNA).

10. The method according to claim 1, wherein the nucleic acid oligomer is a ribonucleic acid (RNA), and a protecting group of a hydroxyl group at a 2'-position of ribose of the nucleic acid oligomer is represented by the following formula (6):

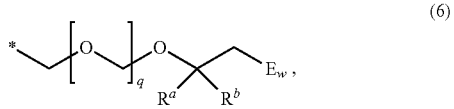

(6)

wherein
q represents an integer from 1 to 5,
$R^a$ and $R^b$ are the same or different and each independently represent a methyl group, an ethyl group or a hydrogen atom,
* represents a bonding point to an oxygen atom derived from a hydroxyl group at a 2'-position of ribose, and
$E_W$ represents an electron withdrawing group.

11. The method according to claim 10, wherein $R^a$ and $R^b$ are simultaneously a hydrogen atom, and $E_W$ is a cyano group.

12. The method according to claim 1, wherein the nucleic acid oligomer has a chain length of at least 40.

13. The method according to claim 1, wherein the nucleic acid oligomer has a chain length of at least 50.

14. The method according to claim 1, wherein the nucleic acid oligomer has a chain length of at least 60.

15. The method according to claim 1, wherein the nucleic acid oligomer has a chain length of at least 80.

16. The method according to claim 1, wherein the nucleic acid oligomer has a chain length of at least 100.

17. A dichloroacetic acid solution, comprising:
formaldehyde; and
dichloroacetic acid,
wherein a molar ratio of formaldehyde to dichloroacetic acid, formaldehyde mol/dichloroacetic acid mol, is $90 \times 10^{-6}$ or less.

18. The dichloroacetic acid solution according to claim 17, wherein the molar ratio of formaldehyde to dichloroacetic acid is $3 \times 10^{-6}$ or less.

19. The dichloroacetic acid solution according to claim 17, wherein the molar ratio of formaldehyde to dichloroacetic acid is $22 \times 10^{-6}$ or less.

20. A method for producing the dichloroacetic acid solution according to claim 17, the method comprising:
azeotropically distilling off formaldehyde from an unpurified dichloroacetic acid solution comprising formaldehyde, and a solution comprising an azeotropic solvent that forms an azeotrope with formaldehyde, to obtain a purified dichloroacetic acid solution.

21. The method according to claim 20, wherein the azeotropic solvent has a boiling point of 194° C. or lower.

22. The method according to claim 20, wherein the azeotropic solvent is dichloromethane, acetonitrile, or an aromatic organic solvent.

23. The method according to claim 22, wherein the aromatic organic solvent is toluene.

24. The method for producing a nucleic acid oligomer according to claim 1, further comprising:
azeotropically distilling off formaldehyde from an unpurified dichloroacetic acid solution comprising formaldehyde, and a solution comprising an azeotropic solvent that forms an azeotrope with formaldehyde, to obtain a purified dichloroacetic acid solution; and
reacting the nucleic acid oligomer represented by the formula (1) with the obtained purified dichloroacetic acid solution.

* * * * *

SEQUENCE LISTING

<160> NUMBER OF SEQ ID NOS: 14

<210> SEQ ID NO 1
<211> LENGTH: 21
<212> TYPE: RNA
<213> ORGANISM: Artificial Sequence
<220> FEATURE:
<223> OTHER INFORMATION: Synthetic oligonucleotide
<220> FEATURE:
<221> NAME/KEY: modified_base
<222> LOCATION: (7)..(7), (17)..(17)
<223> OTHER INFORMATION: um
<220> FEATURE:
<221> NAME/KEY: modified_base
<222> LOCATION: (20)..(21)
<223> OTHER INFORMATION: dT

<400> SEQUENCE: 1
auggaanacu cuuggunacn n                                              21

<210> SEQ ID NO 2
<211> LENGTH: 21
<212> TYPE: RNA
<213> ORGANISM: Artificial Sequence
<220> FEATURE:
<223> OTHER INFORMATION: Synthetic oligonucleotide
<220> FEATURE:
<221> NAME/KEY: modified_base
<222> LOCATION: (2)..(2), (12)..(12), (14)..(15), (19)..(19)
<223> OTHER INFORMATION: um
<220> FEATURE:
<221> NAME/KEY: modified_base
<222> LOCATION: (5)..(6), (16)..(17)
<223> OTHER INFORMATION: cm
<220> FEATURE:
<221> NAME/KEY: modified_base
<222> LOCATION: (20)..(21)
<223> OTHER INFORMATION: dT

<400> SEQUENCE: 2
gnaannaaga gnannnnann n                                              21

<210> SEQ ID NO 3
<211> LENGTH: 36
<212> TYPE: RNA
<213> ORGANISM: Artificial Sequence
<220> FEATURE:
<223> OTHER INFORMATION: Synthetic oligonucleotide

<400> SEQUENCE: 3
agagccagcc uucuuauugu uuuagagcua ugcugu                              36

<210> SEQ ID NO 4
<211> LENGTH: 23
<212> TYPE: RNA
<213> ORGANISM: Artificial Sequence
<220> FEATURE:
<223> OTHER INFORMATION: Synthetic oligonucleotide

<400> SEQUENCE: 4
ccaugagaag uaugacaaca gcc                                            23

<210> SEQ ID NO 5
<211> LENGTH: 25
<212> TYPE: RNA
<213> ORGANISM: Artificial Sequence
<220> FEATURE:
<223> OTHER INFORMATION: Synthetic oligonucleotide

<400> SEQUENCE: 5

```
ggcuguuguc auacuucuca ugguu                                            25

<210> SEQ ID NO 6
<211> LENGTH: 67
<212> TYPE: RNA
<213> ORGANISM: Artificial Sequence
<220> FEATURE:
<223> OTHER INFORMATION: Synthetic oligonucleotide

<400> SEQUENCE: 6
acagcauagc aaguuaaaau aaggcuaguc cguuaucaac uugaaaaagu ggcaccgagu      60
cggugcu                                                               67

<210> SEQ ID NO 7
<211> LENGTH: 94
<212> TYPE: RNA
<213> ORGANISM: Artificial Sequence
<220> FEATURE:
<223> OTHER INFORMATION: Synthetic oligonucleotide

<400> SEQUENCE: 7 guuucccuu uucaaagaaa ucuccugggc accaucuuc uuaggugccc ucccuuguuu       60
aaaccugacc aguuaaccgg cugguuaggu uuuu                                 94

<210> SEQ ID NO 8
<211> LENGTH: 100
<212> TYPE: RNA
<213> ORGANISM: Artificial Sequence
<220> FEATURE:
<223> OTHER INFORMATION: Synthetic oligonucleotide

<400> SEQUENCE: 8
aguccucauc ucccucaagc guuuagagc uaguaauagc aaguuaaaau aaggcuaguc      60
cguuaucaac uugaaaaagu ggcaccgagu cggugcuuuu                          100

<210> SEQ ID NO 9
<211> LENGTH: 113
<212> TYPE: RNA
<213> ORGANISM: Artificial Sequence
<220> FEATURE:
<223> OTHER INFORMATION: Synthetic oligonucleotide

<400> SEQUENCE: 9
gcagauguag uguuuccaca guuuaagagc uaugcuggaa acagcauagc aaguuuaaau      60
aaggcuaguc cguuaucaac uugaaaaagu ggcaccgagu cggugcuuuu uuu           113

<210> SEQ ID NO 10
<211> LENGTH: 113
<212> TYPE: RNA
<213> ORGANISM: Artificial Sequence
<220> FEATURE:
<223> OTHER INFORMATION: Synthetic oligonucleotide
<220> FEATURE:
<221> NAME/KEY: modified_base
<222> LOCATION: (1)..(1), (8)..(8), (17)..(18)
<223> OTHER INFORMATION: dA
<220> FEATURE:
<221> NAME/KEY: modified_base
<222> LOCATION: (2)..(2), (19)..(19)
<223> OTHER INFORMATION: dG
<220> FEATURE:
<221> NAME/KEY: modified_base
<222> LOCATION: (3)..(3), (6)..(6), (9)..(9), (11)..(11), (15)..(15)
<223> OTHER INFORMATION: dT
<220> FEATURE:
```

```
<221> NAME/KEY: modified_base
<222> LOCATION: (4)..(5), (7)..(7), (10)..(10), (12)..(14), (16)..(16),
       (20)..(20)
<223> OTHER INFORMATION: dC

<400> SEQUENCE: 10
nnnnnnnnnn nnnnnnnnnn guuuaagagc uaugcuggua acagcauagc aaguuuaaau    60
aaggcuaguc cguuaucaac uugaaaaagu ggcaccgagu cggugcuuuu uuu          113

<210> SEQ ID NO 11
<211> LENGTH: 113
<212> TYPE: RNA
<213> ORGANISM: Artificial Sequence
<220> FEATURE:
<223> OTHER INFORMATION: Synthetic oligonucleotide
<220> FEATURE:
<221> NAME/KEY: modified_base
<222> LOCATION: (1)..(1)
<223> OTHER INFORMATION: am
<220> FEATURE:
<221> NAME/KEY: modified_base
<222> LOCATION: (2)..(2)
<223> OTHER INFORMATION: gm
<220> FEATURE:
<221> NAME/KEY: modified_base
<222> LOCATION: (3)..(3), (110)..(112)
<223> OTHER INFORMATION: um

<400> SEQUENCE: 11
nnnccucauc ucccucaagc guuuaagagc uaugcuggua acagcauagc aaguuuaaau    60
aaggcuaguc cguuaucaac uugaaaaagu ggcaccgagu cggugcuuun nnu          113

<210> SEQ ID NO 12
<211> LENGTH: 20
<212> TYPE: RNA
<213> ORGANISM: Artificial Sequence
<220> FEATURE:
<223> OTHER INFORMATION: Synthetic oligonucleotide

<400> SEQUENCE: 12
ggcaccgagu cggugcuuuu                                                20

<210> SEQ ID NO 13
<211> LENGTH: 50
<212> TYPE: RNA
<213> ORGANISM: Artificial Sequence
<220> FEATURE:
<223> OTHER INFORMATION: Synthetic oligonucleotide

<400> SEQUENCE: 13
aaggcuaguc cguuaucaac uugaaaaagu ggcaccgagu cggugcuuuu                50

<210> SEQ ID NO 14
<211> LENGTH: 100
<212> TYPE: RNA
<213> ORGANISM: Artificial Sequence
<220> FEATURE:
<223> OTHER INFORMATION: Synthetic oligonucleotide

<400> SEQUENCE: 14
auaacucaau uuguaaaaaa guuuuagagc uagaaauagc aaguuaaaau aaggcuaguc    60
cguuaucaac uugaaaaagu ggcaccgagu cggugcuuuu                         100
```